US007817509B2

(12) United States Patent
Murakami

(10) Patent No.: US 7,817,509 B2
(45) Date of Patent: Oct. 19, 2010

(54) OPTICAL PICKUP APPARATUS AND BEAM SPLITTER

(75) Inventor: Shinzoh Murakami, Kitakatsuragi-gun (JP)

(73) Assignee: Sharp Kabushiki Kaisha, Osaka-shi (JP)

(*) Notice: Subject to any disclaimer, the term of this patent is extended or adjusted under 35 U.S.C. 154(b) by 379 days.

(21) Appl. No.: 12/048,036

(22) Filed: Mar. 13, 2008

(65) Prior Publication Data

US 2008/0232223 A1 Sep. 25, 2008

(30) Foreign Application Priority Data

Mar. 19, 2007 (JP) .............. 2007-071331

(51) Int. Cl.
*G11B 7/00* (2006.01)
(52) U.S. Cl. .............. 369/44.41; 369/112.01; 369/112.1
(58) Field of Classification Search .............. 369/112.1, 369/112.02, 112.23, 44.23, 44.24, 44.41, 369/44.42, 112.01
See application file for complete search history.

(56) References Cited

U.S. PATENT DOCUMENTS

2004/0184383 A1 9/2004 Nakayama et al.
2006/0262695 A1 11/2006 Tsuchida et al.
2007/0025228 A1* 2/2007 Matsubara et al. ....... 369/112.1
2007/0053272 A1 3/2007 Watanabe et al.

FOREIGN PATENT DOCUMENTS

| CN | 1697042    | 11/2005 |
| CN | 1905023    | 1/2007  |
| JP | 2594445    | 12/1996 |
| JP | 2004-288227 | 10/2004 |
| JP | 2004-303296 | 10/2004 |
| JP | 2005-353252 | 12/2005 |
| JP | 2007-59031 | 3/2007  |

* cited by examiner

*Primary Examiner*—Nabil Z Hindi
(74) *Attorney, Agent, or Firm*—Morrison & Foerster LLP

(57) ABSTRACT

There is provided an optical pickup apparatus and a beam splitter which are capable of suppressing an adverse effect resulting from light reflected by a non-light-condensed layer that is different from a light-condensed layer. In respective TES light-receiving sections, interposed light-receiving elements are disposed so as to be adjacent to first sub beam-receiving elements. The interposed light-receiving elements are disposed away from both of positions where a main beam reflected by a light-condensing recording layer is condensed and where respective sub beams reflected by the light-condensing recording layer are condensed, and disposed so as to be adjacent to the first sub beam-receiving elements. The interposed light-receiving elements receive the main beam reflected by a non-light-condensing recording layer In a compensating section, results of light received by the first sub beam-receiving elements are compensated based on results of light received by the interposed light-receiving elements.

13 Claims, 17 Drawing Sheets

OPTICAL PICKUP APPARATUS AND BEAM SPLITTER

CROSS-REFERENCE TO RELATED APPLICATION

This application claims priority to Japanese Patent Application No. 2007-071331, which was filed on Mar. 19, 2007, the contents of which are incorporated herein by reference in its entirety.

BACKGROUND OF THE INVENTION

1. Field of the Invention

The present invention relates to an optical pickup apparatus and a beam splitter, for use in information recording on or reproducing information from or reproducing information from an optical disk.

2. Description of the Related Art

An optical pickup apparatus is used for recording information on or reproducing information from an optical disk. The optical disk includes a compact disc (abbreviated as CD), a digital versatile disc (abbreviated as DVD) and a Blu-ray disc (registered trademark). A recording/reproducing process of the CD is executed using laser light in an infrared wavelength region around 780 nm. A recording/reproducing process of the DVD is executed using laser light of which wavelength is shorter than that of the laser light used for the recording/reproducing process of the CD; to be specific, red light in a wavelength region around 650 nm. A recording/reproducing process of the Blu-ray disc is executed using laser light of which wavelength is even shorter than that of the laser light used for recording/reproducing process of the DVD; to be specific, blue-violet light in a wavelength region around 405 nm.

In the optical disk, a recording layer is formed. In recording information or reproducing information from the optical disk as mentioned above, the recording layer of the optical disk is irradiated with condensed laser light, and light reflected by the optical disk is then received by a light-receiving unit. By so doing, the information is recorded or reproduced and moreover, a servo control is carried out by detecting a servo signal including a focusing error signal and a tracking error signal.

FIG. 14 is a schematic view showing a configuration of an optical pickup apparatus 1 of related art. In the optical pickup apparatus 1 of related art, light emitted from a light source 2 is split by a diffraction grating 3 into a main beam and a pair of sub beams, which are then transmitted through a beam splitter 4 and converted by a collimation lens 5 into parallel light, thereafter being condensed by an objective lens 6 onto a recording layer 8 of an optical disk 7. Light reflected by the recording layer 8 of the optical disk 7 is then transmitted by the objective lens 6 and the collimation lens 5, thereafter being split and condensed by the beam splitter 4 to be thus received by a light-receiving unit 9. The optical pickup apparatus 1 of related art as just described are disclosed in Japanese Unexamined Patent Publications JP-A 2004-288227 and JP-A 2004-303296.

FIG. 15 is a view showing one example of the beam splitter 4. In the example, the beam splitter 4 is given an additional reference symbol "a", and the beam splitter 4a is thus shown. FIG. 15 shows a relation between the beam splitter 4a and the light-receiving unit 9. The light-receiving unit 9 has a light-receiving section 11 for focusing which is used for producing a focusing error signal, and a pair of light-receiving sections 12a and 12b for tracking, each of which is used for producing a tracking error signal.

The beam splitter 4a is achieved by a hologram element. The beam splitter 4a includes a splitting region 13 for focusing where the light reflected by the recording layer 8 of the optical disc 7 is diffracted so as to fall on the light-receiving section 11 for focusing, and a pair of splitting regions 14a and 14b for tracking where the light reflected by the recording layer 8 of the optical disc 7 is diffracted so as to fall on the respective light-receiving sections 12a and 12b for tracking.

The splitting region 13 for focusing is bounded by the pair of splitting regions 14a and 14b for tracking at a boundary line 15 which is schematically drawn perpendicular to a reference optical axis L of the optical system and along a virtual line 16 extending in a tracking direction T1. Of the boundary line 15, a part 17 is located radially outward of the reference optical axis L of the optical system. The part 17 is formed along the virtual line 16. Of the boundary line 15, a part 18 is located radially inward of the reference optical axis L of the optical system. The part 18 is out of the virtual line 16 so that the splitting region 13 for focusing is larger than a splitting region 13 for focusing which is bounded with use of a part 18 extending along the virtual line 16.

FIG. 16 is a view showing another example of the beam splitter 4. In the example, the beam splitter 4 is given an additional reference symbol "b", and the beam splitter 4b is thus shown. FIG. 16 shows a relation between the beam splitter 4b and the light-receiving unit 9. The beam splitter 4b of the present example is similar to the above-described beam splitter 4a shown as one example in FIG. 15, and only the points different from the beam splitter 4a will be therefore described. In the beam splitter 4b of the example, the part 17 of boundary line 15 located radially outward of the reference optical axis L of the optical system is out of the virtual line 16 so that the pair of the splitting regions 14a and 14b for tracking is larger than a pair of splitting regions 14a and 14b for tracking which is bounded with use of a part 17 extending along the virtual line 16.

In some of the optical disk 7, a plurality of the recording layers 8 are stacked one after the other in a thickness-wise direction of the optical disk 7 in order to increase a recording capacity. In recording information on or reproducing information from the optical disk 7 as described above, the light-receiving unit 9 receives not only the light reflected by a light-condensing recording layer 8a where light emitted from the light source 2 is condensed, but also the light reflected by a non-light-condensing recording layer 8b which is different from the light-condensing recording layer 8b.

FIG. 17 is a view of assistance in briefly explaining how the optical disk 7 having two recording layers 8 transmits and reflects light. In FIG. 17, it is assumed that the non-light-condensing recording layer 8b is located behind the light-condensing recording layer 8a when the optical disk 7 is viewed from the light source 2. Light 21 emitted from the light source 2 is condensed and reflected on the light-condensing recording layer 8a. A part of the light emitted from the light source 2 is transmitted by the light-condensing recording layer 8a. Light 22 transmitted by the light-condensing recording layer 8a is reflected on the non-light-condensing recording layer 8b as if the light 22 is focused on a virtual focus point 23 behind the non-light-condensing recording layer 8b when viewed from the light source 23.

FIG. 18 is a view illustrating how the light reflected by the non-light-condensing recording layer 8b is received by the light-receiving unit 9 through the beam splitter 4a shown in FIG. 15. FIG. 19 is a view illustrating how the light reflected by the non-light-condensing recording layer 8b is received by the light-receiving portion 9 through the beam splitter 4b shown in FIG. 16. In FIG. 18 and FIG. 19, it is assumed that the non-light-condensing recording layer 8b is located behind the light-condensing recording layer 8a when the optical disk 7 is viewed from the light source 2. In this case, light 25 reflected by the non-light-condensing recording layer 8b enters the light-receiving section 11 for focusing and respective light-receiving sections 12a and 12b for tracking more spreadingly than light reflected by the light-condensing recording layer 8a, and is received thereby. This poses a problem that the servo signal is adversely influenced.

SUMMARY OF THE INVENTION

An object of the invention is to an optical pickup apparatus and a beam splitter which are capable of suppressing an adverse effect resulting from light reflected by a non-light-condensing recording layer that is different from a light-condensing recording layer.

The invention provides an optical pickup apparatus which is used for recording information on or reproducing information from an optical disk having a plurality of recoding layers by irradiating the optical disk with light, the optical pickup apparatus comprising:

a light source for emitting light;

an optical system for condensing the light emitted from the light source onto a recording layer of the optical disk and condensing light reflected by the recording layer of the optical disk;

a light-receiving unit for receiving light reflected by the recording layers of the optical disk through the optical system, the light-receiving unit having a first light-receiving portion for receiving light reflected by a light-condensing recording layer which is a recording layer of the optical disk and is currently involved in condensing the light emitted from the light source, the first light-receiving portion being disposed at a condensing position of the light reflected by the light-condensing recording layer, and a second light-receiving portion for receiving light reflected by a non-light-condensing recording layer which is another recoding layer of the optical disk and is currently not involved in condensing the light emitted from the light source, the second light-receiving portion being disposed adjacent to the first light-receiving portion and away from the condensing position of the light reflected by the light-condensing recording layer; and a compensating section for compensating a result of light reception by the first light-receiving portion based on a result of light reception by the second light-receiving portion.

According to the invention, one side of an optical disk is irradiated with light in recording information on or reproducing information on a recording layer of the optical disk. On the recording layer of the optical disk, light emitted from a light source is condensed by an optical system. Light reflected by the recording layer of the optical disk is condensed by an optical system and then received by the light-receiving unit.

The light-receiving unit has a first light-receiving portion and a second light-receiving portion. The first light-receiving portion is disposed at a condensing position of light reflected by a light-condensing recording layer which is a recording layer of the optical disk and is currently involved in condensing light emitted from the light source. The first light-receiving portion receives the light reflected by the light-condensing recording layer. The second light-receiving portion is disposed at a position away from the condensing position of the light reflected by the light-condensing recording layer, which position is adjacent to the first light-receiving portion.

The second light-receiving portion receives light reflected by a non-light-condensing recording layer which is another recording layer of the optical disk and is currently not involved in condensing the light emitted from the light source.

As compared to the light reflected by the light-condensing recording layer, the light reflected by the non-light-condensing recording layer more spreadingly enters the light-receiving unit. Accordingly this causes the light reflected by the non-light-condensing recording layer to be undesirably received by the first light-receiving portion. In view of this point, the compensating portion compensates the result of light reception by the first light-receiving portion, based on the result of light reception by the second light-receiving portion. This enables to suppress the adverse effect resulting from the light reflected by the non-light-condensing recording layer.

Further, in the invention, it is preferable that the optical system splits the light emitted from the light source, into a main beam and a pair of sub beams, and condenses the main beam and sub beams on the recording layer of the optical disk, the first light-receiving portion has a main beam-receiving element, disposed at a condensing position of a main beam reflected by the light-condensing recording layer, for receiving the main beam reflected by the light-condensing recording layer, and a pair of sub beam-receiving elements, disposed at condensing positions of sub beams reflected by the light-condensing recording layer, for respectively receiving the sub beams reflected by the light-condensing recording layer, the second light-receiving portion has a light-receiving part for sub beam compensation which receives the main beam reflected by the non-light-condensing recording layer and is used for compensating a result of light reception by one of the sub beam-receiving elements that the main beam reflected by the non-light-condensing recording layer enters, the light-receiving part for sub beam compensation being disposed adjacent to the sub beam-receiving elements and away from the condensing position of the main beam reflected by the light-condensing recording layer and condensing positions of sub beams reflected by the light-condensing recording layer, and the compensating section compensates a result of light reception by the sub beam-receiving element based on a result of light reception by the light-receiving part for sub beam compensation.

According to the invention, the light emitted from the light source is split by the optical system into a main beam and a pair of the sub beams, and then condensed on a recording layer of the optical disk. The main beam reflected by the light-condensing recording layer is condensed by the optical system and received by the main beam-receiving element. The sub beams reflected by the light-condensing recording layer are respectively condensed by the optical system and received by the sub beam-receiving elements.

As compared to the respective beams reflected by the light-condensing recording layer, the light reflected by the non-light-condensing recording layer more spreadingly enters the light-receiving unit. Accordingly, in view of this point, the light-receiving part for sub beam compensation is disposed adjacent to one of the sub beam-receiving elements that the main beam reflected by the non-light-condensing recording layer enters. And the compensating section compensates the result of light reception by the sub beam-receiving element, based on the result of light reception by the light-receiving part for sub beam compensation. This enables to suppress the adverse effect resulting from the main beam reflected by the non-light-condensing recording layer.

Further, in the invention, it is preferable that the light-receiving part for sub beam compensation has an interposed light-receiving element which is interposed between the one of the sub beam-receiving elements that the main beam reflected by the non-light-condensing recording layer enters and the main beam-receiving element, and an opposite-side light-receiving element which is disposed opposite to the interposed light-receiving element relative to the sub beam-receiving element.

According to the invention, the light-receiving part for sub beam compensation has an interposed light-receiving element and an opposite-side light-receiving element. The interposed light-receiving element is interposed between the main beam-receiving element and the one of the sub beam-receiving elements that the main beam reflected by the non-light-condensing recording layer enters. The opposite-side light-receiving element is disposed opposite to the interposed light-receiving element relative to the sub beam-receiving element. In compensating the result of light reception by the sub beam-receiving element, the result of light reception by the light-receiving part for sub beam compensation as above is used. This allows for high-accuracy compensation of the result of light reception by the sub beam-receiving element. The adverse effect resulting from the main beam reflected by the non-light-condensing recording layer can be therefore suppressed as effectively as possible.

Further, in the invention, it is preferable that the interposed light-receiving element and the opposite-side light-receiving element are integrally formed.

According to the invention, the interposed light-receiving element and the opposite-side light-receiving element are integrated with each other, thus eliminating the need of providing an adder circuit for adding the result of light reception by the interposed light-receiving element to the result of light reception by the opposite-side light-emitting element. This allows for a simplified circuit structure of the compensating section.

Further, in the invention, it is preferable that the optical system splits the light emitted from the light source, into a main beam and a pair of sub beams, and condenses the main beam and sub beams on the recording layer of the optical disk, the first light-receiving portion has a main beam-receiving element, disposed at a condensing position of main beam reflected by the light-condensing recording layer, for receiving the main beam reflected by the light-condensing recording layer, and a pair of sub beam-receiving elements, disposed at condensing positions of sub beams reflected by the light-condensing recording layer, for respectively receiving the sub beams reflected by the light-condensing recording layer, the second light-receiving portion has a light-receiving part for main beam compensation, disposed away from a condensing position of a main beam reflected by the light-condensing recording layer, and condensing positions of sub beams reflected by the light-condensing recording layer, and adjacent to the main beam-receiving element, for receiving the main beam reflected by the non-light condensing layer, which is used for compensating a result of light reception by the main beam-receiving element, and the compensating section compensates a result of light reception by the main beam-receiving element based on a result of light reception by the light-receiving part for main beam compensation.

According to the invention, the light emitted from the light source is split by the optical system into the main beam and the pair of the sub beams, and then condensed on the recording layer of the optical disk. The main beam reflected by the light-condensing recording layer is condensed by the optical system and received by the main beam-receiving element. The sub beams reflected by the light-condensing recording layer are respectively condensed by the optical system and received by the sub beam-receiving elements.

As compared to the respective beams reflected by the light-condensing recording layer, the main beam reflected by the non-light-condensing recording layer more spreadingly enters the light-receiving unit. In view of this point, the light-receiving part for main beam compensation is disposed adjacent to the main beam-receiving element. And the compensating section compensates the result of light reception by the main beam-receiving element, based on the result of light reception by the light-receiving part for main beam compensation. This enables to suppress the adverse effect resulting from the main beam reflected by the non-light-condensing recording layer.

Further, in the invention, it is preferable that the light-receiving part for main beam compensation has a one-side light-receiving element which is interposed between one of the pair of the sub beam-receiving elements and the main beam-receiving element, and an other-side light-receiving element which is disposed between another of the pair of the sub beam-receiving elements and the main beam-receiving element.

According to the invention, the light-receiving part for main beam compensation has a one-side light-receiving element and an other-side light-receiving element. The one-side light-receiving element is interposed between one of the pair of sub beam-receiving elements and the main beam-receiving element. The other-side light-receiving element is interposed between the other of the pair of sub beam-receiving elements and the main beam-receiving element. In compensating the result of light reception by the main beam-receiving element, the result of light reception by the light-receiving part for main beam compensation as above is used. This allows for high-accuracy compensation of the result of light reception by the main beam-receiving element. The adverse effect resulting from the main beam reflected by the non-light-condensing recording layer can be therefore suppressed as effectively as possible.

Further, in the invention, it is preferable that the one-side light-receiving element and the other-side light-receiving element are integrally formed.

According to the invention, the one-side light-receiving element and the other-side light-receiving element are integrated with each other, thus eliminating the need of providing an adder circuit for adding the result of light reception by the one-side light-receiving element to the result of light reception by the other-side light-emitting element. This allows for a simplified circuit structure of the compensating section.

Further, in the invention, it is preferable that in the compensating section, an amplification degree of the result of light reception by the second light-receiving portion relative to the result of light reception by the first light-receiving portion is predetermined based on a ratio of the light reflected by the non-light-condensing recording layer between a quantity of light entering the first light-receiving portion and a quantity of light entering the second light-receiving portion, and in compensating the result of light reception by the first light-receiving portion, the result of light reception by the second light-receiving portion is amplified at the amplification degree, and a result thus obtained is subtracted from the result of light reception by the first light-receiving portion.

According to the invention, the amplification degree of the result of light reception by the second light-receiving portion relative to the result of light reception by the first light-receiving portion is set in advance based on the ratio of the light reflected by the non-light-condensing recording layer between the quantity of light entering the first light-receiving portion and the quantity of light entering the second light-light receiving portion. In order to compensate the result of light reception by the first light-receiving portion, the result of light reception by the second light-receiving portion is amplified at the above amplification degree, and a result thus obtained is subtracted from the result of light reception by the first light-receiving portion. This allows for high-accuracy compensation of the result of light reception by the first light-receiving portion. The adverse effect resulting from the main beam reflected by the non-light-condensing recording layer can be therefore suppressed as effectively as possible.

Further, in the invention, it is preferable that the light-receiving unit has a pair of light-receiving sections for tracking which are used for producing a tracking error signal and each of which includes the first light-receiving portion and the second light-receiving portion, and to produce the tracking error signal, the optical system splits the light reflected by the light-condensing recording layer and diffracts the split lights so as to fall on light-receiving sections for tracking, respectively.

According to the invention, the light-receiving unit has the pair of the light-receiving units for tracking which are used for producing the tracking error signal. The light reflected by the light-condensing recording layer is split by the optical system and split lights are diffracted to fall on the light-receiving sections for tracking, respectively. Each of the light-receiving sections for tracking includes the first light-receiving portion and the second light-receiving portion. The result of light reception by the first light-receiving portion is compensated based on the result of light reception by the second light-receiving portion. As a result, the tracking error signal can have smaller noise components and offset components which are generated by the light reflected by the non-light-condensing recording layer. This enables to prevent the track servo from deteriorating in property.

The invention provides a beam splitter for splitting light reflected by a recording layer of an optical disk, the beam splitter being included in the optical system in the optical pickup apparatus mentioned above wherein the light-receiving unit has a light-receiving section for focusing that is used for producing a focusing error signal and a pair of light-receiving sections for tracking that are used for producing a tracking error signal and have the first light-receiving portion and the second light-receiving portion, the beam splitter comprising:

a splitting region for focusing by which light reflected by a light-condensing recording layer is diffracted to fall on the light-receiving section for focusing; and a pair of splitting regions for tracking in each of which light reflected by a light-condensing recording layer is diffracted to fall on each of the light-receiving sections for tracking.

According to the invention, the light reflected by the light-condensing recording layer is diffracted by the splitting region for focusing and the respective splitting regions for tracking to thereby fall on the light-receiving unit. The light fallen from the splitting region for focusing is in a condensed state and in such a state, the light enters the light-receiving section for focusing and is thus received thereby. The light fallen from the respective splitting regions for tracking is in a condensed state and in such a state, the light enters the respective light-receiving sections for tracking. On the basis of the results of light received by the light-receiving section for focusing and respective light-receiving sections for tracking, the focusing error signal and the tracking error signal can be produced.

Each of the light-receiving sections for tracking includes the first light-receiving portion and the second light-receiving portion. The result of light reception by the first light-receiving portion is compensated based on the result of light reception by the second light-receiving portion. As a result, the tracking error signal can have smaller noise components and offset components which are generated by the light reflected by the non-light-condensing recording layer. This enables to prevent the track servo from deteriorating in property.

Further, in the invention, it is preferable that, of a boundary line between the splitting region for focusing and the pair of the splitting regions for tracking, a part located radially outward of a reference optical axis of the optical system is formed along a virtual line which is orthogonal to the reference optical axis and extends in a tracking direction.

According to the invention, of the boundary line between the splitting region for focusing and the pair of the splitting regions for tracking, a part located radially outward of the reference optical axis of the optical system, is formed along the virtual line which is orthogonal to the reference optical axis and extends in a tracking direction. Accordingly, in the case where the focusing error signal is produced by the knife edge method, the amplitude can be large and the balance between the positive component and the negative component can be favorable in the focusing error signal.

Further, in the invention, it is preferable that, of a boundary line between the splitting region for focusing and the pair of the splitting regions for tracking, a part located radially outward of the reference optical axis of the optical system is out of a virtual line which is orthogonal to the reference optical axis and extends in a tracking direction, so that the pair of the splitting regions for tracking are larger than a pair of the splitting regions for tracking which are bounded with use of the part extending along the virtual line.

According to the invention, of the boundary line between the splitting region for focusing and the pair of the splitting regions for tracking, the part located radially outward of the reference optical axis of the optical system is out of the virtual line which is orthogonal to the reference optical axis and extends in the tracking direction, so that the pair of the splitting regions for tracking are larger than the pair of the splitting regions for tracking which are bounded with use of the part extending along the virtual line. This enables to increase a quantity of light which is reflected by the light-condensing recording layer and enters the respective light-receiving sections for tracking. Accordingly, the S/N ratio can be improved in the tracking error signal.

Further, in the invention, it is preferable that, of the boundary line between the splitting region for focusing and the pair of the splitting regions for tracking, a part located radially inward of the reference optical axis of the optical system is out of the virtual line so that, of light reflected by a non-light-condensing recording layer, zero-order diffracted light enters the splitting region for focusing.

According to the invention, of the boundary line between the splitting region for focusing and the pair of the splitting regions for tracking, the part located radially inward of the reference optical axis of the optical system is out of the virtual line so that, of the light reflected by the non-light-condensing recording layer, the zero-order diffracted light enters the splitting region for focusing. The zero-order diffracted light of the light reflected by the non-light-condensing recording layer does not therefore enter the splitting regions for tracking. Accordingly, the zero-order diffracted light of the light reflected by the non-light-condensing recording layer does not reach the respective light-receiving sections for tracking. As a result, the tracking error signal can be prevented from being adversely influenced by the zero-order diffracted light of the light reflected by the non-light-condensing recording layer.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
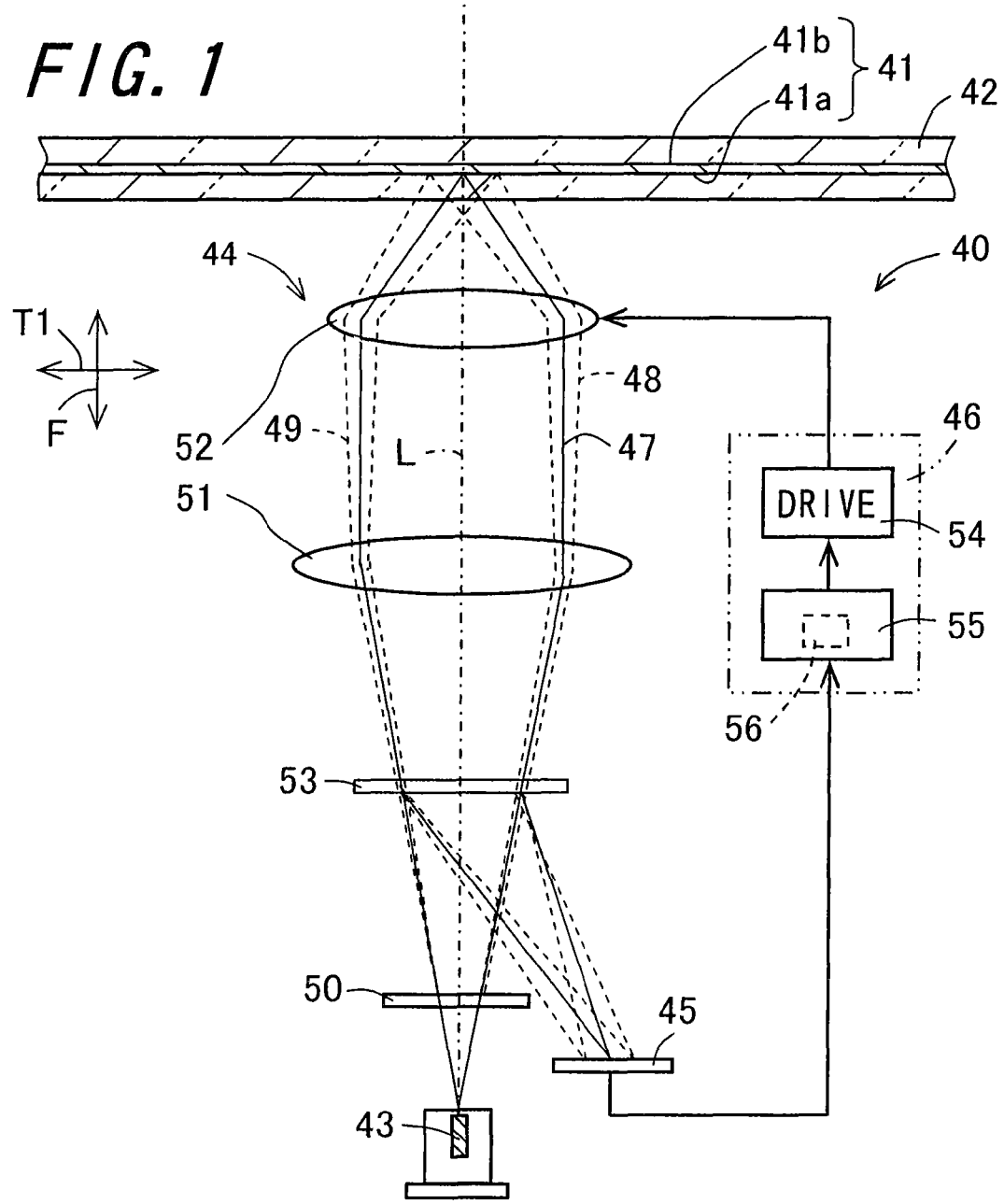
FIG. 1 is a schematic view showing an optical pickup apparatus according to a first embodiment of the invention.

Now referring to the drawings, preferred embodiments of the invention are described below.

FIG. 1 is a schematic view showing a configuration of an optical pickup apparatus 40 according to a first embodiment of the invention. The optical pickup apparatus 40 according to the present embodiment is used to record or reproduce information on recording layers 41 of an optical disk 42 by emitting light to one side of the optical disk 42 having a plurality of the recording layers 41.

The respective recording layers 41 of the optical disk 42 are stacked in a thickness-wise direction of the optical disk 42. In each of the recording layers 41 of play-only optical disk 42, a pit train is spirally formed as constituting a track. In the play-only optical disk 42 as just stated, the pits express information. In each of the recording layers 41 of optical disk 42 for recording, a land and a groove are spirally formed as constituting a track. In the optical disk 42 for recording as just stated, recording marks formed in the land or groove express information.

One example of the optical disk 42 is a digital versatile disk (abbreviated as DVD). In the present embodiment, descriptions will be made on the assumption that the optical disk 42 is a DVD of a type called a single sided dual-layer disk. Of the respective recording layers 41 of the optical disk 42, the recording layer 41 which is a recording layer of the optical disk and is currently involved in condensing the light emitted from a later-described light source 43 will be hereinafter referred to as a light-condensing recording layer 41a, and the recording layer 41 which is different from the light-condensing recording layer 41a, i.e., which is another recoding layer of the optical disk and is currently not involved in condensing the light emitted from the later-described light source 43 will be hereinafter referred to as a non-light-condensing recording layer 41b.

The optical pickup apparatus 40 includes a light source 43, an optical system 44, a light-receiving unit 45, and an adjusting section 46. The light source 43 emits light. The optical system 44 is used to condense the light emitted from the light source 43 onto the recording layer 41 of the optical disk 42, and condenses the light reflected by the recording layer 41 of the optical disk 42. The light-receiving unit 45 receives through the optical system 44 the light reflected by the recording layer 41 of the optical disk 42. The adjusting section adjusts a light-condensing position on the optical system 44 based on a result of light reception by the light-receiving unit 45. The optical pickup apparatus 40 as just described is disposed so that a reference optical axis L of the optical system 44 is orthogonal to the optical disk 42 which is driven to rotate by a spindle motor.

The light source 43 is achieved by a laser diode. The light source 43 emits the light of which wavelength region is suitable for recording information on or reproducing information from the optical disk 42. In the present embodiment where the DVD is employed as the optical disk 42, the light source 43 is a laser diode which emits light in the wavelength region around 650 nm that is suitable for recording information on or reproducing information from the DVD. The wavelength region around 650 nm is a red wavelength region.

The optical system 44 includes a diffraction grating 50, a collimation lens 51, an objective lens 52, and a beam splitter 53. Through the diffraction grating 50, light emitted from the light source 43 is diffracted and split into a main beam 47 and a pair of sub beams 48 and 49. Through the collimation lens 51, the respective beams 47-49 coming from the diffraction grating 50 are converted into parallel light. Through the objective lens.52, the respective beams 47-49 coming from the collimation lens 51 are condensed onto the recording layer 41 of the optical disk 42. Through the beam splitter 53, the respective beams 47-49 reflected by the recording layer 41 of the optical disk 42 are split.

In the diffraction grating 50, concavities and convexities are formed at intervals. The main beam 47 is zero-order diffracted light diffracted by the diffraction grating 50. The respective sub beams 48 and 49 are ± first-order diffracted light diffracted by the diffraction grating 50. On the recording layer 41 of the optical disk 42, the respective sub beams 48 and 49 shift on both sides of a tracking direction T1 and both sides of a tangential direction T2 relative to the main beam 47. The tracking direction T1 and the tangential direction T2 are orthogonal to the reference optical axis L and are orthogonal to each other. The tracking direction T1 corresponds to a radial direction of the optical disk 42. The tangential direction T2 corresponds to a tangential direction of the optical disk 42.

The objective lens 52 is displaced in a focusing direction F and the tracking direction T1 within a movable range including a neutral position. At the neutral position, an optical axis of the objective lens 52 becomes coaxial with the reference optical axis L. The focusing direction F extends along the reference optical axis L, being oriented toward and away from the optical disk 42.

The beam splitter 53 is interposed between the diffraction gratin 50 and the collimation lens 51. Through the beam splitter 53, the light emitted from the light source 43 is transmitted without being diffracted, and the light reflected by the recording layer 41 of the optical disk 42 is transmitted and thereby diffracted.

The adjusting section 46 includes a drive unit 54 and a control unit 55. The drive unit 54 drives the objective lens 52 to be displaced in the focusing direction F and the tracking direction T1. The control unit 55 controls the drive unit 54 based on the result of light reception by the light-receiving unit 45. On the basis of the result just stated, the control unit 55 produces a tracking error signal and a focusing error signal and in accordance with these signals, the control unit 55 performs a track servo control and a focus servo control. This allows the drive unit 54 to drive the objective lens 52 to be displaced in the focusing direction F and the tracking direction T1 so that the light-condensing position of the objective lens 52 follows the track in the light-condensing recording layer 41a. In the embodiment, the control unit 55 includes a compensating section 56 which compensates the result of light reception by the light-receiving unit 45.

Figure 2:
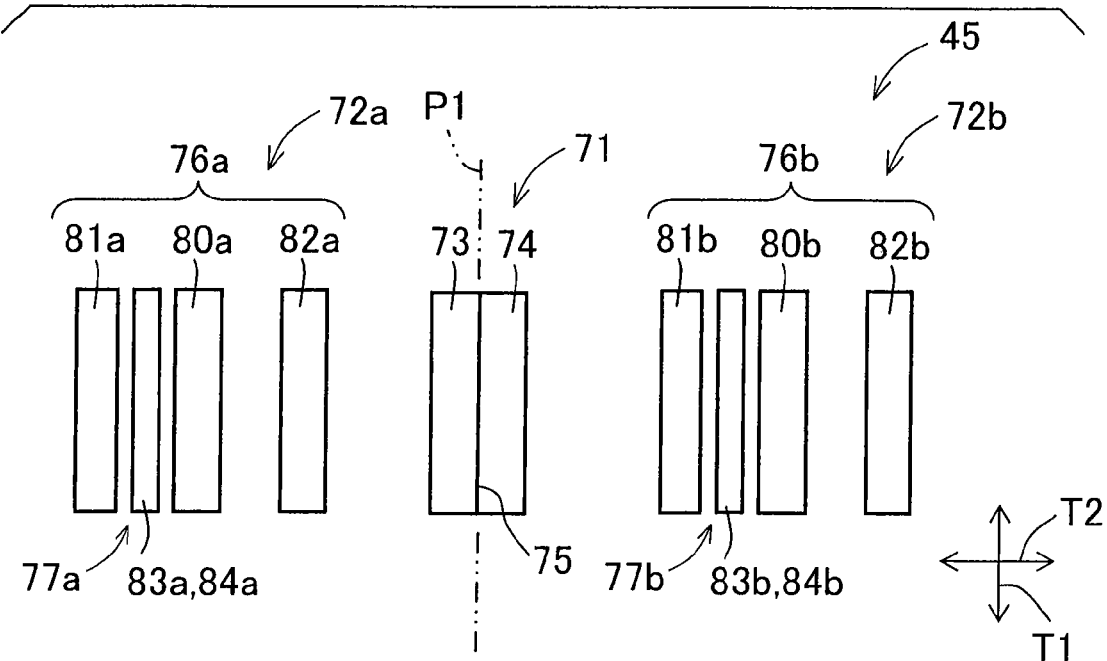
FIG. 2 is a front view showing a configuration of a light-receiving portion.

FIG. 2 is a front view showing a configuration of the light-receiving unit 45. The light-receiving unit 45 includes a light-receiving section 71 for focusing and a pair of light-receiving sections 72a and 72b for tracking. The light-receiving section 71 for focusing is used to produce the focusing error signal. The pair of light-receiving sections 72a and 72b for tracking is used to produce the tracking error signal. The light-receiving section 71 for focusing and the respective light-receiving sections 72a and 72b for tracking are arranged in the tangential direction T2. The light-receiving section 71 for focusing (hereinafter referred to as "FES light-receiving section") is disposed at the same position as the reference optical axis L along the tangential direction T2. One light-receiving section 72a for tracking (hereinafter referred to as "first TES light-receiving section") is disposed on one side of the FES light-receiving section 71 along the tangential direction T2 so as to be away from the FES light-receiving section 71. The other light-receiving section 72b for tracking (hereinafter referred to as "second TES light-receiving section") is disposed on the other side of the FES light-receiving section 71 along the tangential direction T2 so as to be away from the FES light-receiving section 71.

The FES light-receiving section 71 is disposed at a position where the main beam reflected by the light-condensing recording layer 41a is condensed, and has a pair of a main beam-receiving element 73 and a main beam-receiving element 74 which receive the main beam reflected by the light-condensing recording layer 41a. The main beam-receiving element 73 and the main beam-receiving element 74 are adjacent to each other with no space therebetween along the tangential direction T2. A boundary line 15 between the main beam-receiving element 73 and the main beam-receiving element 74 is included in the first virtual plane P1. The first virtual plane P1 includes the reference optical axis L and is orthogonal to the tangential direction T2. In the following descriptions, the main beam-receiving element located on one side in the first virtual plane P1 will be referred to as the first main beam-receiving element 73 while the main beam-receiving element located on the other side in the first virtual plane P1 will be referred to as the second main beam-receiving element 74.

The first TES light-receiving section 72a includes the first light-receiving portion 76a and the second light-receiving portion 77a. The first light-receiving portion 76a is disposed at a position where the light reflected by the light-condensing recording layer 41a is condensed, and receives the light reflected by the light-condensing recording layer 41a. The second light-receiving portion 77a is disposed adjacent to the first light receiving portion 76a and away from the position where the light reflected by the light-condensing recording layer 41a is condensed, and receives the light reflected by the non-light-condensing recording layer 41b.

The first light-receiving portion 76a includes a main beam-receiving element 80a and a pair of sub beam-receiving elements 81a and 82a. The main beam-receiving element 80a is disposed at a position where main beam reflected by the light-condensing recording layer 41a is condensed, and receives the main beam reflected by the light-condensing recording layer 41a. The sub beam-receiving elements 81a and 81b are respectively disposed at positions where the sub beams reflected by the light-condensing recording layer 41a are condensed, and respectively receive the sub beams reflected by the light-condensing recording layer 41a. The main beam-receiving element 80a and the respective sub beam-receiving elements 81a and 82a are arranged in the tangential direction T2. One sub beam-receiving element (hereinafter referred to as "first sub beam-receiving element") 81a is disposed on one side of the main beam-receiving element 80a along the tangential direction T2 so as to be away from the main beam-receiving element 80a. The other sub beam-receiving element (hereinafter referred to as "second sub beam-receiving element") 82a is disposed on one side of the main beam-receiving element 80a along the tangential direction T2 so as to be away from the main beam-receiving element 80a.

The second light-receiving portion 77a includes a light-receiving part 83a for sub beam compensation. The main beam reflected by t he non-light-condensing recording layer 41b reaches the first sub beam-receiving element 81a among the pair of sub beam-receiving elements 81a and 81b. The light-receiving part 83a for sub beam compensation is used to compensate the result of light reception by the first light-receiving part 83a for sub beam compensation. The light-receiving part 83a for sub beam compensation is disposed adjacent to the first sub beam-receiving element 81a and away from both of the positions where the main beam reflected by the light-condensing recording layer 41a is condensed and where the respective sub beams reflected by the light-condensing recording layer 41a are condensed, and receives the main beam reflected by the non-light-condensing recording layer 41b. In the embodiment, the light-receiving part 83a for sub beam compensation includes an interposed light-receiving element 84a which is interposed between the first sub beam-receiving element 81a and the main beam-receiving element 80a.

The second TES light-receiving section 72b is so similar to the first TES light-receiving section 72a that descriptions of the second TES light-receiving section 72b will be omitted to avoid overlapping explanations. Corresponding parts will be denoted by the same reference numerals with "b" instead of "a".

The light-receiving elements 73, 74, 80a to 82a, 84a, 80b to 82b, and 84b of the light-receiving unit 45 respectively have light-receiving surfaces of substantially rectangular shape. The respective light-receiving surfaces of the light-receiving elements 73, 74, 80a to 82a, 84a, 80b to 82b, and 84b extend in the tracking direction T1. The light-receiving surfaces of the light-receiving elements 73, 74, 80a to 82a, 84a, 80b to 82b, and 84b as above are respectively achieved by photodiodes.

Figure 3:
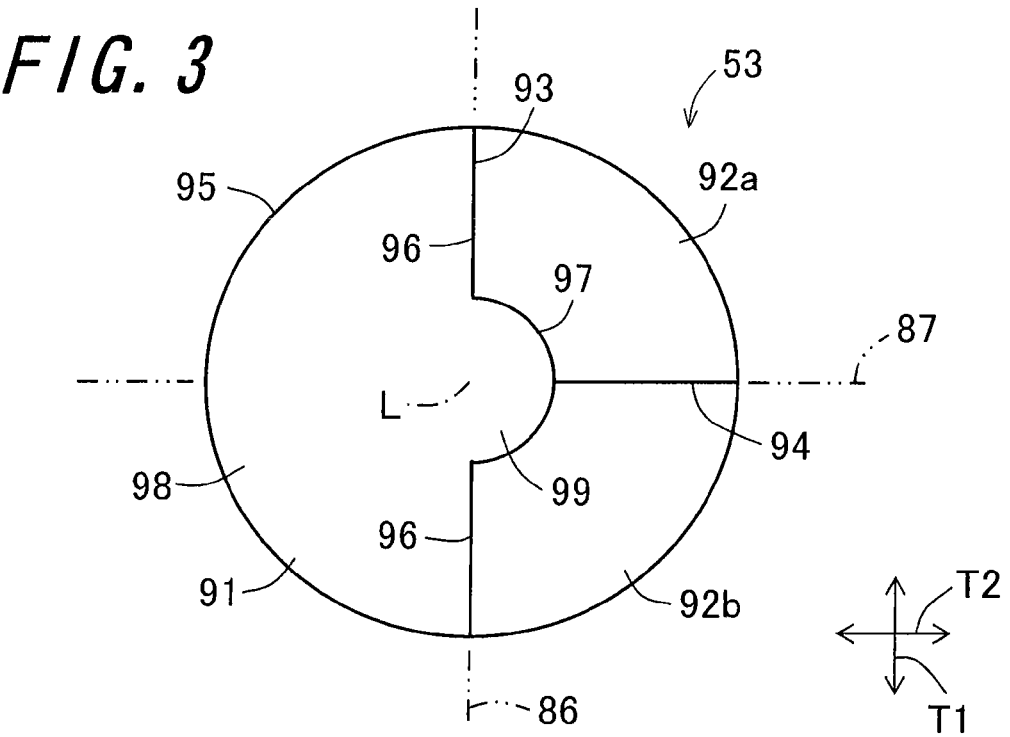
FIG. 3 is a front view showing a configuration of a beam splitter.

FIG. 3 is a front view showing a configuration of the beam splitter 53. The beam splitter 53 is achieved by a hologram element. The beam splitter 53 is disposed along the second virtual plane which is perpendicular to the reference optical axis L. The beam splitter 53 is formed so as to include a passage region through which the light reflected by the light-condensing recording layer 41a passes, when viewed along the reference optical axis L. In the embodiment, a contour of the beam splitter 53 viewed along the reference optical axis L is a circle of which center is positioned on the reference optical axis L.

The beam splitter 53 has a splitting region 91 for focusing and a pair of splitting regions 92a and 92b for tracking. In the splitting region 91 for focusing, the light reflected by the light-condensing recording layer 41a is diffracted so as to fall onto the FES light-receiving section 71. In the splitting regions 92a and 92b for tracking, the light reflected by the light-condensing recording layer 41a is diffracted so as to fall onto each of the pair of TES light-receiving sections 72a and 72b. The splitting region 91 for focusing and the respective splitting regions 92a and 92b for tracking are disposed along the second virtual plane which is perpendicular to the reference optical axis L. The splitting region 91 for focusing and the splitting regions 92a and 92b for tracking respectively have a plurality of grooves. A depth and intervals of these grooves are determined based on diffraction efficiency and arrangement of the light-receiving unit 45.

For the sake of convenience in the descriptions, the first virtual line 86 and a second virtual line 87 are assumed. The first virtual line 86 is orthogonal to the reference optical axis L and extends in the tracking direction T1 in the second virtual plane. The second virtual line 87 is orthogonal to the reference optical axis L and extends in the tangential direction T2 in the second virtual plane.

Schematically, a most part of the splitting region 91 for focusing (hereinafter referred to as "FES splitting region 91") is positioned on one side of the first virtual line 86. The one splitting region 92a for tracking (hereinafter referred to as "first TES splitting region 92a") is positioned on the other side of the first virtual line 86 and on one side of the second virtual line 87. The other splitting region 92b for tracking (hereinafter referred to as "second TES splitting region 92b") is positioned on the other side of the first virtual line 86 and on the other side of the second virtual line 87.

In the beam splitter 53, the first boundary line 93 and a second boundary line 94 are formed. The first boundary line 93 draws a line between the FES splitting region 91 and the respective TES splitting regions 92a and 92b. The second boundary line 94 draws a line between the first TES splitting region 92a and the second TES splitting region 92b. The first boundary line 93 is formed schematically along the first virtual line 86, and both ends of the first boundary line 93 are connected to a circumference 95 of the beam splitter 53. Of the first boundary line 93, a part located radially outward of the reference optical axis L is called a part 96. The part 96 is formed along the first virtual line 86. Of the first boundary line 93, a part located radially inward of the reference optical axis L is called a part 97. The part 97 is located on the other side of the first virtual line 86. In the embodiment, the part 97 is formed into a semicircular arc of which center is positioned on the reference optical axis L. The second boundary line 94 is formed along the second virtual line 87, and one end of the second boundary line 94 is connected to a middle part between the both ends of the first boundary line 93 while the other end of the secondary boundary line 94 is connected to the circumference 95 of the beam splitter 53.

In other words, the FES splitting region 91 has a body part 98 and a protruding part 99. The body part 98 constitutes a part of beam splitter 53 located on one side of the first virtual line 86. The protruding part 99 is connected to the body part 98 and protrudes from the body part 98 to the other side of the first virtual line 86. In the embodiment, the protruding part 99 is formed into a semicircular shape of which center is positioned on the reference optical axis L. The first TES splitting region 92a is defined in the beam splitter 53 by excluding a part overlapping the protruding part 99 from a part which is located on the other side of the first virtual line 86 and on the one side of the second virtual line 87. The second TES splitting region 92b is defined in the beam splitter 53 by excluding a part overlapping the protruding part 99 from a part which is located on the other side of the first virtual line 86 and on the other side of the second virtual line 87.

Figure 4:
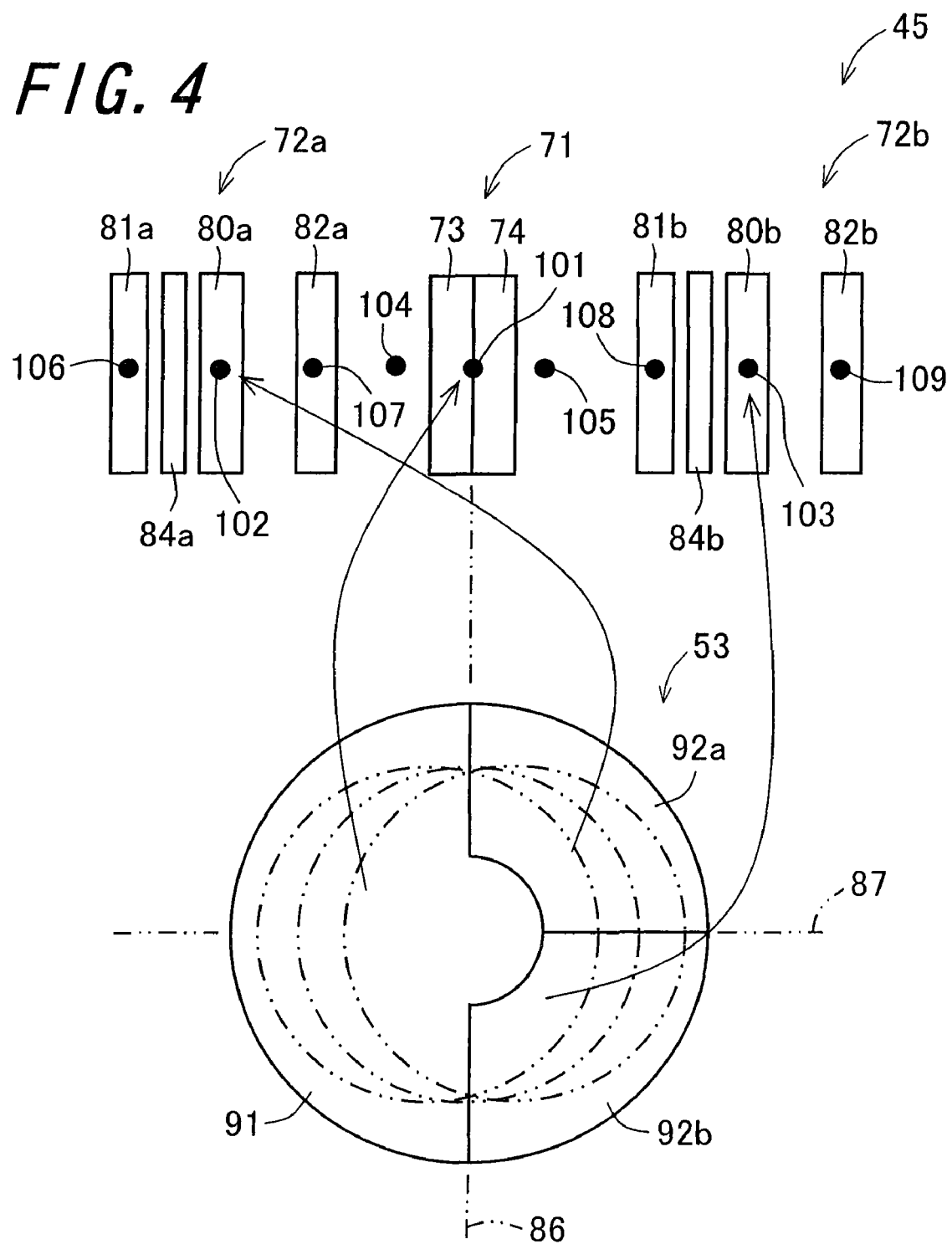
FIG. 4 is a view showing a relation between the beam splitter and the light-receiving portion.

FIG. 4 is a view showing a relation between the beam splitter 53 and the light-receiving unit 45. For the sake of facilitating the understanding, the light reflected by the non-light-condensing recording layer 41b is omitted, and only the light reflected by the light-condensing recording layer 41a is shown in FIG. 4. The main beam reflected by the light-condensing recording layer 41a and the respective sub beams reflected by the light-condensing recording layer 41a enter the beam splitter 53.

The main beam reflected by the light-condensing recording layer 41a is diffracted by the FES splitting region 91 and the respective TES splitting regions 92a and 92b so as to fall on the light-receiving unit. The light fallen from the FES splitting region 91 is in a condensed state and in such a state, the light reaches the vicinity of a boundary line 75 between the main beam-receiving element 73 and main beam-receiving element 74 of the FES light-receiving section 71, thereby forming a light spot 101 on the respective main beam-receiving elements 73 and 74. The light fallen from the first TES splitting region 92a is in a condensed state and in such a state, the light reaches the main beam-receiving element 80a of the first TES light-receiving section 72a, thereby forming a light spot 102 on the main beam-receiving element 80a. The light fallen from the second TES splitting region 92b is in a condensed state and in such a state, the light reaches the main beam-receiving element 80b of the second TES light-receiving section 72b, thereby forming a light spot 103.

The respective sub beams coming form the light-condensing recording layer 41a are diffracted by the FES splitting region 91 and the respective TES splitting regions 92a and 92b so as to fall on the light-receiving unit. The light fallen from the FES splitting region 91 is in a condensed state and in such a state, the light reaches a part between the first TES light-receiving section 72a and the FES light-receiving section 71 and a part between the second TES light-receiving section 72b and the FES light-receiving section 71, thereby respectively forming a light spot 104 on a part between the first TES light-receiving section 72a and the FES light-receiving section 71 and a light spot 105 on a part between the second TES light-receiving section 72b and the FES light-receiving section 71. The light fallen from the first TES splitting region 92a is in a condensed state and in such a state, the light reaches the respective sub beam-receiving elements 81a and 82a of the first TES light-receiving section 72a, thereby respectively forming a light spot 106 on the sub beam-receiving element 81a and a light spot 107 on the sub beam-receiving element 82a. The light fallen from the second TES splitting region 92b is in a condensed state and in such a state, the light reaches the respective sub beam-receiving elements 81b and 82b of the first TES light-receiving section 72b, thereby respectively forming a light spot 108 on the sub beam-receiving element 81b and a light spot 109 on the sub beam-receiving element 82b.

The light reflected by the light-condensing recording layer 41a does not reach the interposed light-receiving elements 84a of the first TES light-receiving section 72a nor the interposed light-receiving element 84b of the second TES light-receiving element 72b. In detail, the main beam reflected by the light-condensing recording layer 41a and the respective sub beams reflected by the light-condensing recording layer 41a do not reach the respective interposed light-receiving elements 84a and 84b.

Figure 5:
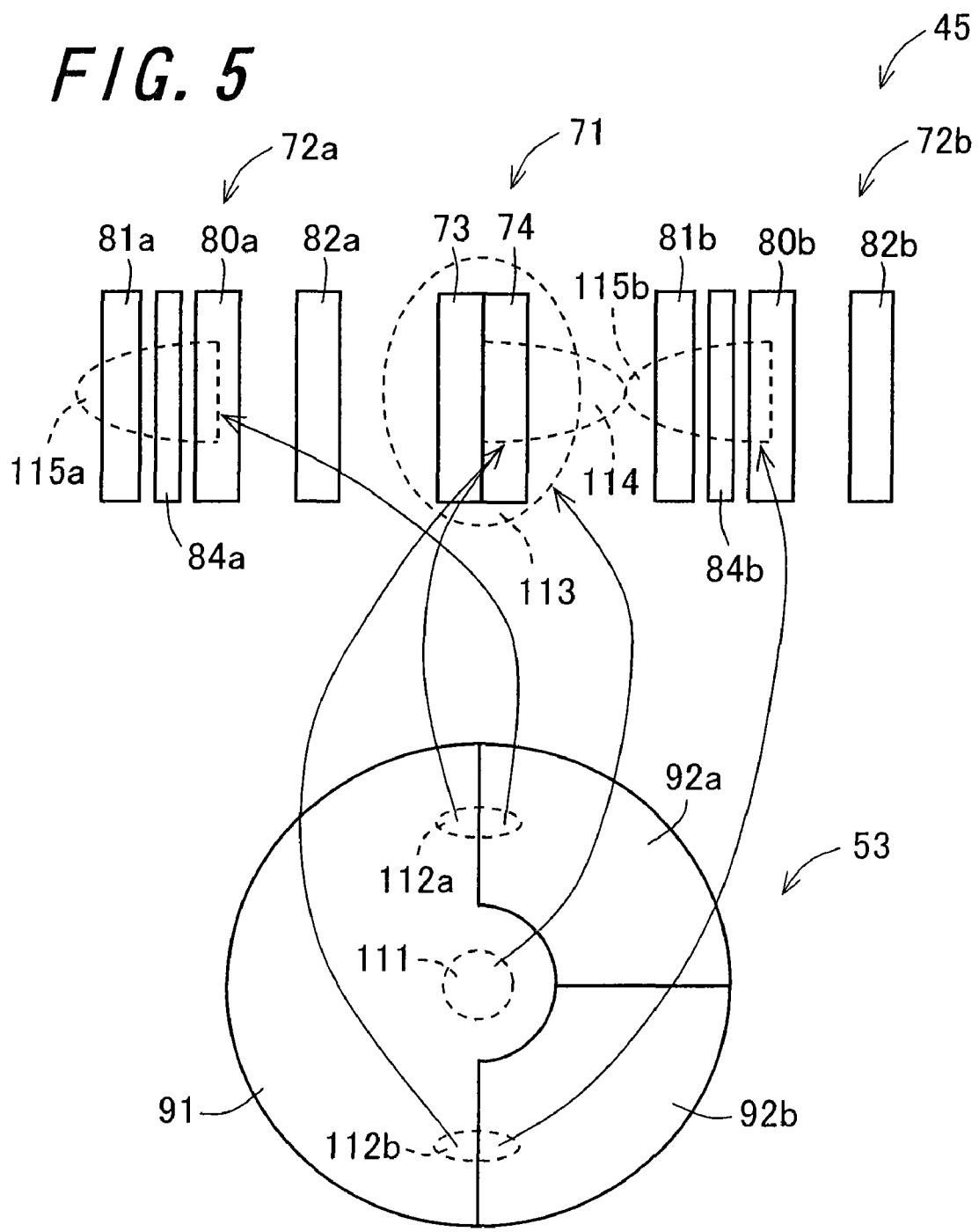
FIG. 5 is a view illustrating how light reflected by a non-light-condensing recording layer is received.

FIG. 5 is a view illustrating how the light reflected by the non-light-condensing recording layer 41b is received. For the sake of facilitating the understanding, the light reflected by the light-condensing recording layer 41a is omitted, and only the light reflected by the non-light-condensing recording layer 41b is shown in FIG. 5. For the sake of furthermore facilitating the understanding, the respective sub beams coming from the non-light-condensing recording layer 41b are omitted, and only the main beam reflected by the non-light-condensing recording layer 41b is shown in FIG. 5. In FIG. 5, it is assumed that the non-light-condensing recording layer 41b is located behind the light-condensing recording layer 41a when the optical disk 42 is viewed from the light source 43. The zero-order diffracted light of main beam coming from the non-light-condensed layer 41b and the ± first-order diffracted light of sub beams from the non-light-condensed layer 41b enter the beam splitter 53.

The zero-order diffracted light of main beam coming from the non-light-condensing recording layer 41b forms a light spot 111 on the beam splitter 53 in the vicinity of the standard optic axis L. The light spot 111 is formed only on the FES splitting region 91 among the respective splitting regions 91, 92a, and 92b of the beam splitter 53. To put it the other way around, shape and size of the beam splitter 53, particularly the protruding part 99 in the FES splitting region 91, are set so that the light spot 111 is formed only in the FES splitting region 91 among the respective splitting regions 91, 92a, and 92b of the beam splitter 53. Even in the case where the light spot 111 becomes the maximum, the shape and size of the protruding part 99 in the FES splitting region 91 are desirably set so as to include the whole light spot 111. The light spot 111 becomes the maximum when a layer-to-layer refractive index is the maximum and a layer-to-layer spacing is the minimum between the light-condensing recording layer 41a and the non-light-condensing recording layer 41b.

The zero-order diffracted light of main beam coming from the non-light-condensing recording layer 41b is diffracted by the FES splitting region 91 so as to fall on the light-receiving unit. The zero-order diffracted light of main beam coming from the non-light-condensing recording layer 41b passes through the FES splitting region 91 and falls on the FES light-receiving section 71, thereby forming a light spot 113 on the FES light-receiving section 71. The light spot 113 is spread more than the light spot 101 of the main beam reflected by the light-condensing recording layer 41a. In the embodiment, the zero-order diffracted light of main beam coming from the non-light-condensing recording layer 41b passes through the FES splitting region 91, thereafter falling on and being thus received by the respective main beam-receiving elements 73 and 74 in the FES light-receiving section 71.

The ± first-order diffracted light of main beam coming from the non-light-condensed layer 41b form a light spot 112a and a light spot 112b on the beam splitter 53, respectively, on both sides of the reference optical axis L along the tracking direction T1. The light spot 112a of the + first-order diffracted light is formed across the first TES splitting region 92a and the FES splitting region 91. The light spot 112b of − first-order diffracted light is formed across the second TES splitting region 92b and the FES splitting region 91.

The ± first-order diffracted light of main beam coming from the non-light-condensed layer 41b is diffracted by the FES splitting region 91 so as to fall on the light-receiving unit. The ± first-order diffracted light of main beam coming from the non-light-condensing recording layer 41b passes through the FES splitting region 91 and falls on the FES light-receiving section 71, thereby forming the substantially same light spots 114 on the FES light-receiving section 71. The light spot 114 is spread more than the light spot 101 of the main beam reflected by the light-condensing recording layer 41a. In the embodiment, the ± first-order diffracted light of main beam coming from the non-light-condensing recording layer 41b passes through the FES splitting region 91, thereafter falling on and being thus received by the second main beam-receiving element 74 in the FES light-receiving section 71.

The + first-order diffracted light of main beam coming from the non-light-condensed layer 41b is diffracted by the first TES splitting region 92a so as to fall on the light-receiving unit. The + first-order diffracted light of main beam coming from the non-light-condensing recording layer 41b passes through the first TES splitting region 92a and falls on the first TES light-receiving section 72a, thereby forming a light spot 115a on the first TES light-receiving section 72a. The light spot 115a is spread more than the respective light spots 102, 106, and 107 of beams reflected by the light-condensing recording layer 41a. In the embodiment, the + first-order diffracted light of main beam coming from the non-light-condensing recording layer 41b passes through the first TES splitting region 92a, thereafter falling on and being thus received by the main beam-receiving element 80a, the first sub beam-receiving element 81a, and the interposed light-receiving element 84a in the first TES light-receiving section 72a.

The − first-order diffracted light of main beam coming from the non-light-condensed layer 41b is diffracted by the second TES splitting region 92b so as to fall on the light-receiving unit. The − first-order diffracted light of main beam coming from the non-light-condensing recording layer 41b passes through the first TES splitting region 92a and falls on the second TES light-receiving section 72b, thereby forming a light spot 115b on the second TES light-receiving section 72b. The light spot 115b is spread more than the respective light spots 103, 108, and 109 of beams reflected by the light-condensing recording layer 41a. In the embodiment, the − first-order diffracted light of main beam coming from the non-light-condensing recording layer 41b passes through the second TES splitting region 92b, thereafter falling on and being thus received by the main beam-receiving element 80b, the first sub beam-receiving element 81*b*, and the interposed light-receiving element 84*b* in the second TES light-receiving section 72*b*.

The focusing error signal is produced by the knife edge method. In the embodiment, the first boundary line 93 of the beam splitter 53 is recognized as a knife edge. In the knife edge method, the focusing error signal is obtained by determining a difference between a result S73 of light received by the main beam-receiving element 73 and a result S74 of light received by the main beam-receiving element 74 in the FES light-receiving section 71. To be specific, the focusing error signal FES is calculated by the following formula (1).

$$FES = S73 - S74 \quad (1)$$

When the light emitted from the light source 43 is focused at a position closer to the light source 43 (on a near side) relative to the light-condensing recording layer 41*a*, the light reflected by the light-condensing recording layer 41*a* is focused in front of the FES light-receiving section 71. In this case, the result S74 of light received by the second main beam-receiving element 74 is larger than the result S73 of light received by the first main beam-receiving element 73, in a consequence whereof the focusing error signal FES becomes minus.

In contrast, in the case where a virtual focal point of the light emitted from the light source 43 is made behind the light-condensing recording layer 41*a* (on a far side) when viewed from the light source 43, a virtual focal point of the light reflected by the light-condensing recording layer 41*a* is made behind the FES light-receiving section 71. In this case, the result S73 of light received by the first main beam-receiving element 73 is larger than the result S74 of light received by the second main beam-receiving element 74, in a consequence whereof the focusing error signal FES becomes plus.

The tracking error signal is produced by the differential push pull method (abbreviated as DPP method). In the DPP method, the tracking error signal is produced based on the result of light reception by the first TES light-receiving section 72*a* and the result of light reception by the second TES light-receiving section 72*b*.

In producing the tracking error signal, the results of light received by the first light-receiving portions 76*a* and 76*b* are compensated in the respective TES light-receiving sections 72*a* and 72*b* based on the results of light received by the second light-receiving portions 77*a* and 77*b*. In the embodiment, the result S81*a* of light received by the first sub beam-receiving element 81*a* is compensated in the first TES light-receiving section 72*a* based on the result S84*a* of light received by the interposed light-receiving element 84*a* serving as the light-receiving part 83*a* for sub beam compensation. Further, the result S81*b* of light received by the first sub beam-receiving element 81*b* is compensated in the second TES light-receiving section 72*b* based on the result S84*b* of light received by the interposed light-receiving element 84*b* serving as the light-receiving part 83*b* for sub beam compensation. To be specific, the compensations are carried out by calculating the following formula (2) and formula (3).

$$S81aR = S81a - k11 \times S84a \quad (2)$$

$$S81bR = S81b - k12 \times S84b \quad (3)$$

In the above formula (2), S81*a*R represents a result obtained by compensating the result S81*a* of light received by the first sub beam-receiving elements 81*a*. In the above formula (3), S81*b*R represents a result obtained by compensating the result S81*b* of light received by the first sub beam-receiving element 81*b*. Both of k11 and k12 are coefficients which respectively represent amplification degrees of the results S84*a* and S84*b* of light received by the interposed light-receiving elements 84*a* and 84*b* with respect to the results S81*a* and S81*b* of light received by the first sub beam-receiving elements 81*a* and 81*b*. The amplification degrees have been predetermined based on a ratio of the ± first-order diffracted light of main beam coming from the non-light-condensing recording layer 41*b* between a quantity of light entering the first sub beam-receiving elements 81*a* and 81*b* and a quantity of light entering the interposed light-receiving elements 84*a* and 84*b*.

The tracking error signal TES is obtained by calculating the following formula (4).

$$TES = (S80a - S80b) - k13 \times \{(S81aR - S81bR) + (S82a - S82b)\} \quad (4)$$

In the formula (4), (S80*a*−S80*b*) represents a push pull signal of main beam, and (S81*a*R−S81*b*R) and (S82*a*−S82*b*) represent push pull signals of respective sub beams. In the case of employing the DPP method, the concavities and convexities for defining a pitch are set in the diffraction grating 50 so that the push pull signals of respective sub beams are out of phase with the push pull signal of main beam by 180 degrees. This enables to cancel the offset which is caused by shift of the objective lens 5 and appears in the tracking error signal. In the formula (4), k13 represents a coefficient which is used for compensating the difference in light intensity between the main beam and the respective sub beams. When the intensity ratio is indicated by main beam:one sub beam:the other sub beam=a:b:b, the coefficient k13 is equal to a/(2b). The coefficient k13 can be determined based on the depth of grooves in the diffraction grating 50.

An information reproducing signal is obtained by summing the results S73 and S74 of light respectively received by the main beam-receiving elements 73 and 74 of the FES light-receiving section 71, the result S80*a* of light received by the main beam-receiving element 80*a* of the first TES light-receiving section 72*a*, and the result S80*b* of light received by the main beam-receiving element 80*b* of the second TES light-receiving section 72*b*. To be specific, the information reproducing signal RF is obtained by calculating the following formula (5).

$$RF = S73 + S74 + S80a + S80b \quad (5)$$

In the embodiment as above, the ± first diffracted light of main beam coming from the non-light-condensing recording layer 41*b* passes through the respective TES splitting regions 92*a* and 92*b* and is undesirably received by the first sub beam-receiving elements 81*a* and 81*b* in the respective TES light-receiving sections 72*a* and 72*b*. In view of this point, the compensating section 56 compensates the results S81*a* and S81*b* of light received by the first sub beam-receiving elements 81*a* and 81*b*, as described above, based on the results S84*a* and S84*b* of light received by the interposed light-receiving elements 84*a* and 84*b*. Accordingly, it is possible to suppress the adverse effect on the tracking error signal, which effect is caused by the ± first-order diffracted light of main beam coming from the non-light-condensing recording layer 41*b*.

The light intensity of the respective sub beams is low; that is, approximately one tenth of the light intensity of the main beam. Accordingly, in producing the tracking error signal, the amplification degree of the results S81*a*, S81*b*, S82*a*, and S82*b* of light received by the respective sub beam-receiving elements 81*a*, 81*b*, 82*a*, and 82*b*, are set to be larger than the amplification degree of the results S80*a* and S80*b* of light received by the respective main beam-receiving elements 80*a* and 80b. Consequently, a serious adverse effect is caused when the ± first-order diffracted light of main beam coming from the non-light-condensing recording layer 41b is received by the respective sub beam-receiving elements 81a, 81b, 82a and 82b. The compensation is therefore performed, as described above, on the results S81a and S81b of light received by the first sub beam-receiving elements 81a and 81b. This enables to effectively suppress the adverse effect resulting from the ± first-order diffracted light of main beam coming from the non-light-condensing recording layer 41b.

In compensating the results S81a and S81b of light received by the first sub beam-receiving elements 81a and 81b, the results S84a and S84b of light received by the interposed light-receiving elements 84a and 84b are amplified and thus-obtained results after the amplification are subtracted from the results S81a and S81b of light received by the first sub beam-receiving elements 81a and 81b. On this point, please refer to the above formula (2) and formula (3). The amplification degrees of the results S84a and S84b of light received by the interposed light-receiving elements 84a and 84b, relative to the results S81a and S81b of light received by the first sub beam-receiving elements 81a and 81b, are pre-determined based on the ratio of the ± first-order diffracted light of main beam coming from the non-light-condensing recording layer 41b between a quantity of light entering the first sub beam-receiving elements 81a and 81b and a quantity of light entering the interposed light-receiving elements 84a and 84b. This allows for high-accuracy compensation of the results S81a and S81b of light received by the first sub beam-receiving elements 81a and 81b. The adverse effect resulting from the ± first-order diffracted light of main beam coming from the non-light-condensing recording layer 41b can be therefore suppressed as effectively as possible.

The shape and size of the beam splitter 53, particularly the protruding portion 98 of the FES splitting region 91, are set so that the zero-order diffracted light of main beam coming from the non-light-condensing recording layer 41b enters only the FES splitting region 91 among the respective splitting regions 91, 92a, and 92b of the beam splitter 53. The zero-order diffracted light of main beam coming from the non-light-condensing recording layer 41b does not therefore enter the TES splitting regions 92a and 92b. Accordingly, the zero-order diffracted light of main beam coming from the non-light-condensing recording layer 41b does not reach the respective TES light-receiving sections 72a and 72b. As a result, the tracking error signal can be prevented from being adversely influenced by the zero-order diffracted light of main beam coming from the non-light-condensing recording layer 41b.

The tracking error signal can be thus prevented from being adversely influenced by the zero-order diffracted light of main beam coming from the non-light-condensing recording layer 41b and being adversely influenced by the ± first-order diffracted light of main beam coming from the non-light-condensing recording layer 41b. As a result, the tracking error signal can have smaller noise components and offset components which are generated by the main beam reflected by the non-light-condensing recording layer 41b. This enables to prevent the track servo from deteriorating in property.

The zero-order diffracted light of main beam coming from the non-light-condensing recording layer 41b passes through the FES splitting region 91 and is undesirably received by the respective main beam-receiving elements 73 and 74 of the FES light-receiving section 71. The light fallen from the FES splitting region 91 forms the light spot 113 which is very bleary as compared to the main beam reflected by the non-light-condensing recording layer 41b. Consequently, regarding the quantity of light entering the respective main beam-receiving elements 73 and 74 of the FES light-receiving section 71, a quantity of the zero-order diffracted light of main beam coming from the non-light-condensing recording layer 41b is sufficiently smaller than a quantity of main beam reflected by the non-light-condensing recording layer 41a. Moreover, in producing the focusing error signal, a difference is determined between the result S73 of light received by the main beam-receiving element 73 of the FES light-receiving section 71 and the result S74 of light received by the main beam-receiving element 73 of the FES light-receiving section 71. In this point, please refer to the above formula (1). Accordingly, noises contained in the results S73 and S74 of light received by the respective main beam-receiving elements 73 and 74 cancel each other out. As a result, the focusing error signal has sufficiently small noise components and offset components which are generated by the zero-order diffracted light of main beam coming from the non-light-condensing recording layer 41b.

The ± first-order diffracted light of main beam coming from the non-light-condensing recording layer 41b passes through the FES splitting region 91 and is undesirably received by the second beam-receiving element 74 in the FES light-receiving section 71. The light fallen from the FES splitting region 91 forms the light spot 114 which is very bleary as compared to the main beam reflected by the light-condensing recording layer 41a. Moreover, the light intensity of the ± first-order diffracted light of main beam coming from the non-light-condensing recording layer 41b is very small compared to the light intensity of the main beam reflected by the light-condensing recording layer 41a. As a result, the focusing error signal has sufficiently small noise components and offset components which are generated by the ± first-order diffracted light of main beam coming from the non-light-condensing recording layer 41b.

In the beam splitter 53, of the first boundary line 93, the part 96 located radially outward of the reference optical axis L is formed along the first virtual line 86. Accordingly, in the case where the focusing error signal is produced by the knife edge method, the amplitude can be large and the balance between the positive component and the negative component can be favorable in the focusing error signal.

Figure 6:
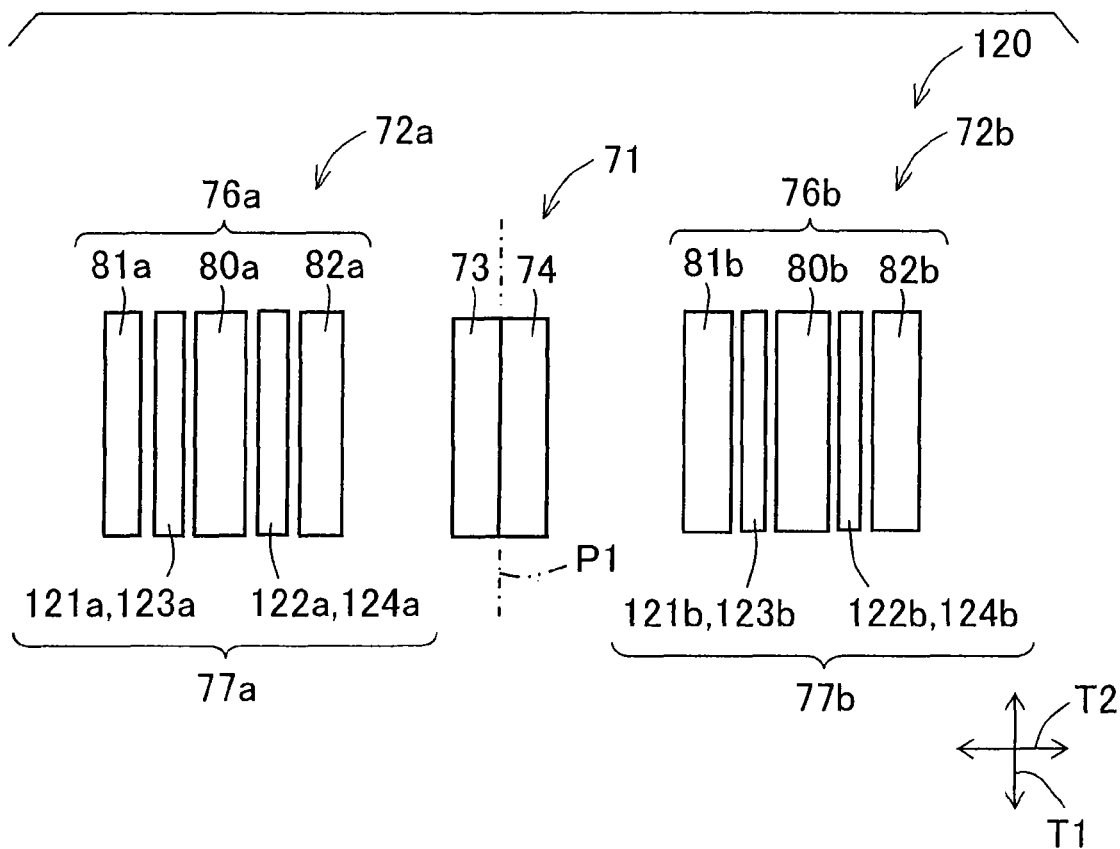
FIG. 6 is a front view showing a configuration of a light-receiving unit disposed in an optical pickup apparatus according to a second embodiment of the invention.

FIG. 6 is a front view showing a configuration of a light-receiving unit 120 disposed in an optical pickup apparatus according to a second embodiment of the invention. The optical pickup apparatus according to the present embodiment is similar to the above optical pickup apparatus 40 according to the first embodiment, and therefore corresponding parts will be denoted by the same reference symbols and descriptions thereof will be omitted while only different points will be described.

The second light-receiving portion 77a in the first TES light-receiving section 72a includes the first light-receiving part 121a for sub beam compensation and a second light-receiving part 122a for sub beam compensation. The first sub beam-receiving part 121a is used for compensating the result of light reception by the first sub beam-receiving element 81a. The second light-receiving part 122a for sub beam compensation is used for compensating the result of light reception by the second sub beam-receiving element 82a.

The first light-receiving part 121a for sub beam compensation is disposed way from both of the positions where the main beam reflected by the light-condensing recording layer 41a is condensed and where the respective sub beams reflected by the light-condensing recording layer 41a are condensed so that the first light-receiving part 121a for sub beam compensation is adjacent to the first sub beam-receiving element 81a. The first light-receiving part 121a for sub beam compensation includes an interposed light-receiving element 123a between the first sub beam-receiving element 81a and the main beam-receiving element 80a.

The second light-receiving part 122a for sub beam compensation is disposed way from both of the positions where the main beam reflected by the light-condensing recording layer 41a is condensed and where the respective sub beams reflected by the light-condensing recording layer 41a are condensed so that the second light-receiving part 122a for sub beam compensation is adjacent to the second sub beam-receiving element 82a. The second light-receiving part 122a for sub beam compensation includes an interposed light-receiving element 124a between the second sub beam-receiving element 82a and the main beam-receiving element 80a.

The interposed light-receiving elements 123a and 124a of the second light-receiving portion 77a in the first TES light-receiving section 72a respectively have light-receiving surfaces of substantially rectangular shape. The light-receiving surfaces of the interposed light-receiving elements 123a and 124a respectively extend in the tracking direction T1. The interposed light-receiving elements 123a and 124a as above are respectively achieved by photodiodes.

The second light-receiving portion 77b in the second TES light-receiving section 72b is so similar to the second light-receiving portion 77a in the first TES light-receiving section 72a that descriptions of the second light-receiving portion 77b will be omitted to avoid overlapping explanations. Corresponding parts will be denoted by the same reference numerals with "b" instead of "a".

Figure 7:
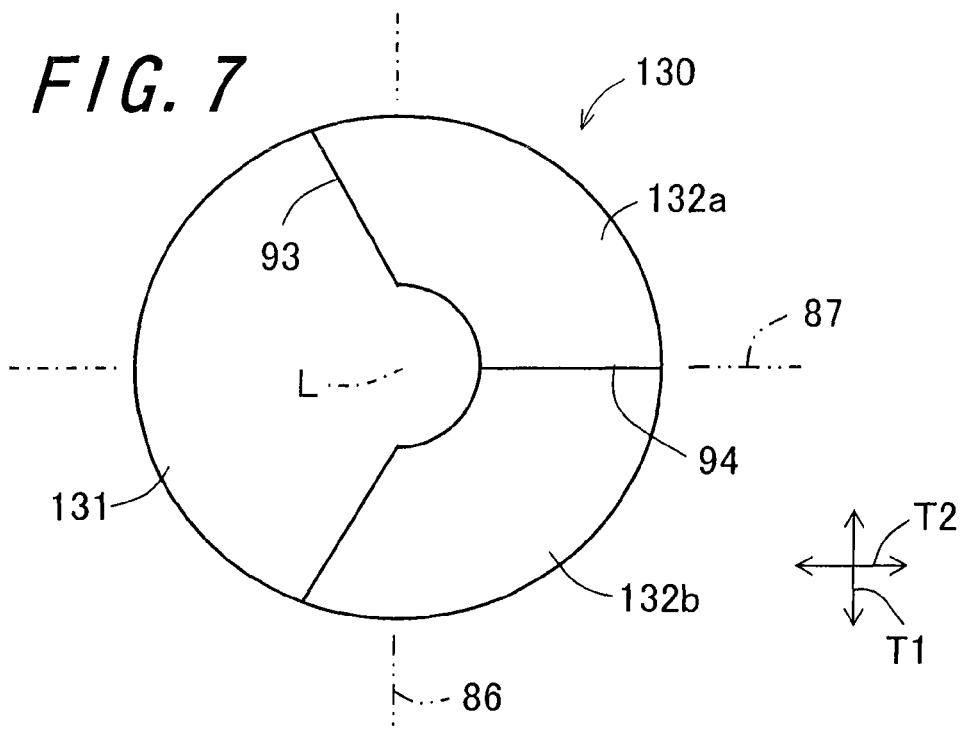
FIG. 7 is a front view showing a configuration of a beam splitter.

FIG. 7 is a front view showing a configuration of a beam splitter 130. A most part of an FES splitting region 131 is located on one side of the first virtual line 86. A most part of the first TES splitting region 132a is located on the other side of the first virtual line 86 and on one side of the second virtual line 87. A most part of a second TES splitting region 132b is located on the other side of the first virtual line 86 and on the other side of the second virtual line 87.

Of the first boundary line 93, the part 96 located radially outward of the reference optical axis L is out of the first virtual line 86 so that the pair of TES splitting regions 132a and 132b are larger than those which are bounded with use of the part 96 extending along the first virtual line 86. In the present embodiment, the part 96 of first boundary line 93 located radially outward of the reference optical axis L inclines with respect to the first virtual line 86 so that the part 96 positioned outward of the reference optical axis L is distanced further away from the first virtual line 86.

Figure 8:
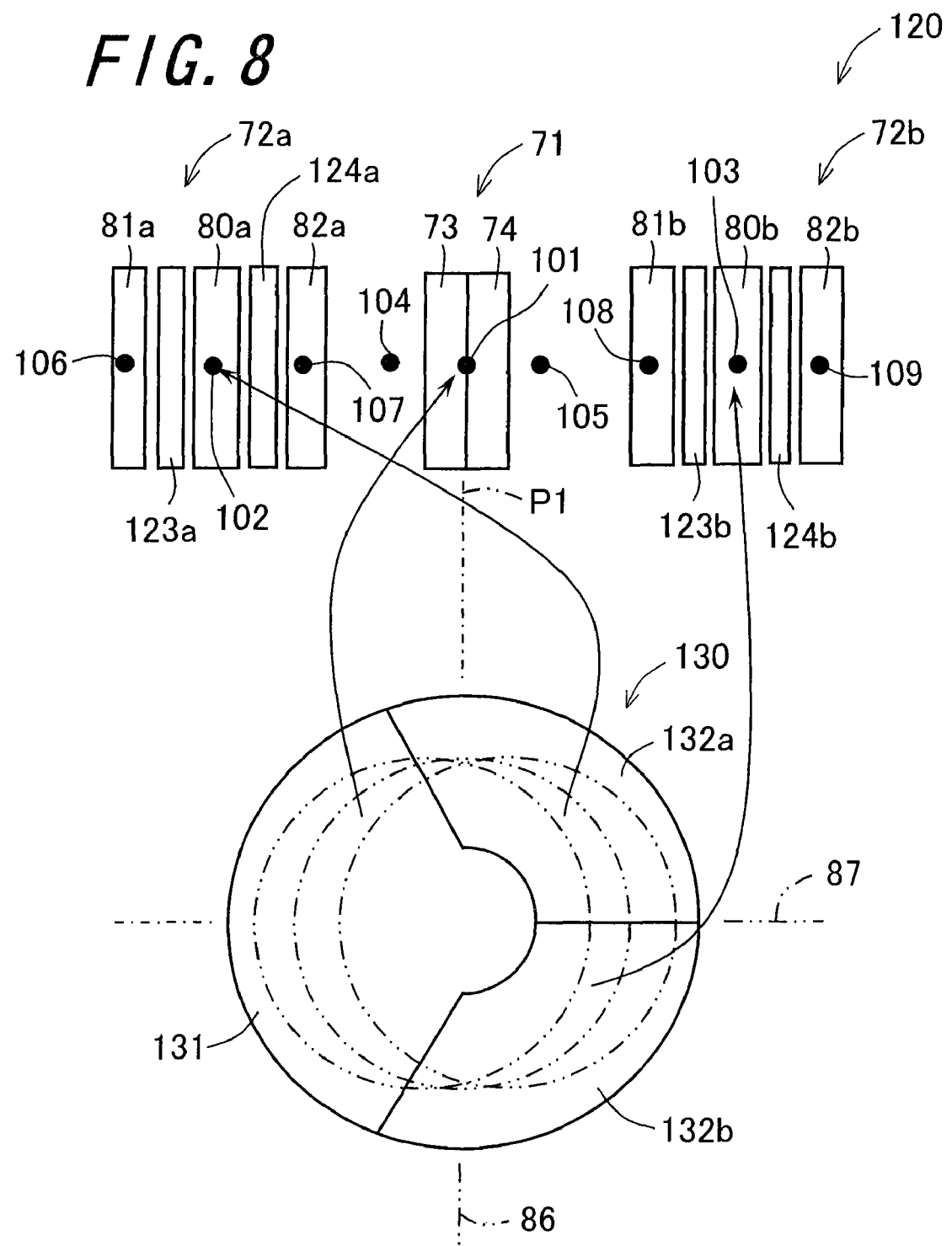
FIG. 8 is a view showing a relation between the beam splitter and the light-receiving unit.

FIG. 8 is a view showing a relation between the beam splitter 130 and the light-receiving unit 120. For the sake of facilitating the understanding, the light reflected by the non-light-condensing recording layer 41b is omitted, and only the light reflected by the light-condensing recording layer 41a is shown in FIG. 8.

The light reflected by the light-condensing recording layer 41a does not reach the respective interposed light-receiving elements 123a and 124a in the first TES light-receiving section 72a. In detail, the main beam reflected by the light-condensing recording layer 41a and the respective sub beams reflected by the light-condensing recording layer 41a do not reach the interposed light-receiving elements 123a and 124a, respectively.

The light reflected by the light-condensing recording layer 41a does not reach the respective interposed light-receiving elements 123b and 124b in the second TES light-receiving section 72b. In detail, the main beam reflected by the light-condensing recording layer 41a and the respective sub beams reflected by the light-condensing recording layer 41a do not reach the interposed light-receiving elements 123b and 124b, respectively.

Figure 9:
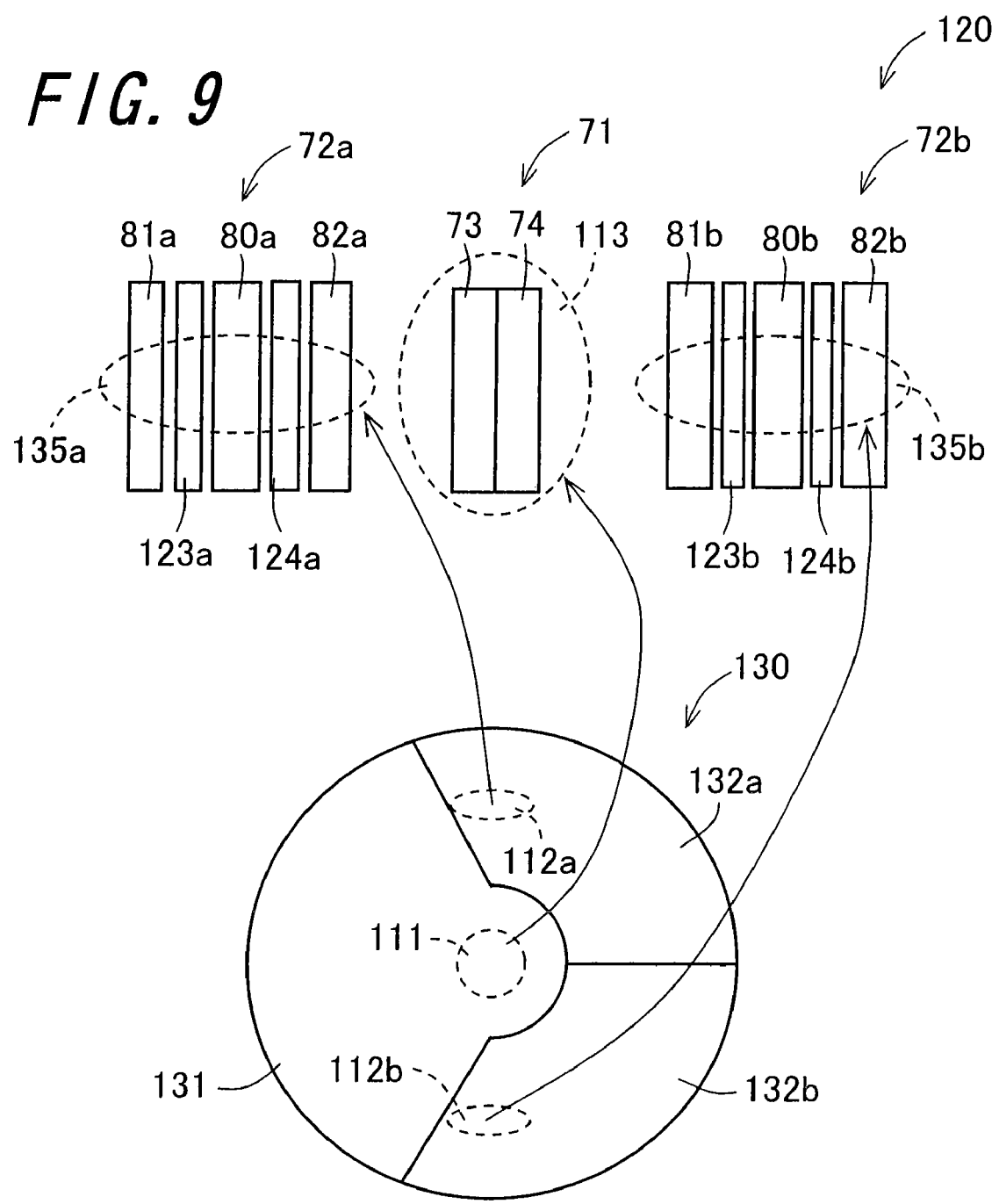
FIG. 9 is a view illustrating how light reflected by a non-light-condensing recording layer is received.

FIG. 9 is a view illustrating how the light reflected by the non-light-condensing recording layer 41b is received. For the sake of facilitating the understanding, the light reflected by the light-condensing recording layer 41a is omitted, and only the light reflected by the non-light-condensing recording layer 41b is shown in FIG. 9. For the sake of facilitating the understanding, the respective sub beams reflected by the non-light-condensing recording layer 41b are omitted, and only the main beam reflected by the non-light-condensing recording layer 41b is shown in FIG. 9. In FIG. 9, it is assumed that the non-light-condensing recording layer 41b is located behind the light-condensing recording layer 41a when the optical disk 42 is viewed from the light source 43.

The ± first-order diffracted light of main beam coming from the non-light-condensing recording layer 41b forms the light spot 112a and the light spot 112b on the beam splitter 130, respectively, on both sides of the reference optical axis L along the tracking direction T1. The light spot 112a of the + first-order diffracted light is formed in the first TES splitting region 132a. The light spot 112b of − first-order diffracted light is formed in the second TES splitting region 132b.

The + first-order diffracted light of main beam coming from the non-light-condensed layer 41b is diffracted by the first TES splitting region 132a so as to fall on the light-receiving unit. The + first-order diffracted light of main beam coming from the non-light-condensing recording layer 41b passes through the first TES splitting region 132a and falls on the first TES light-receiving section 72a, thereby forming a light spot 135a on the first TES light-receiving section 72a. The light spot 135a is spread more than the respective light spots 102, 106, and 107 of beams reflected by the light-condensing recording layer 41a. In the embodiment, the + first-order diffracted light of main beam coming from the non-light-condensing recording layer 41b passes through the first TES splitting region 132a, thereafter falling on and being thus received by the main beam-receiving element 80a, the respective sub beam-receiving elements 81a and 82a, and the respective interposed light-receiving elements 123a and 123a in the first TES light-receiving section 72a.

The − first-order diffracted light of main beam coming from the non-light-condensed layer 41b is diffracted by the second TES splitting region 132b so as to fall on the light-receiving unit. The − first-order diffracted light of main beam coming from the non-light-condensing recording layer 41b passes through the second TES splitting region 132b and falls on the second TES light-receiving section 72b, thereby forming a light spot 135b on the second TES light-receiving section 72b. The light spot 135b is spread more than the respective light spots 103, 108, and 109 of beams reflected by the light-condensing recording layer 41a. In the embodiment, the light fallen from the second TES splitting region 132b reaches the main beam-receiving element 80b, the respective sub beam-receiving elements 81b and 82b, and the respective interposed light-receiving elements 123b and 124b in the second TES light-receiving section 72b.

In producing the tracking error signal, the results of light received by the first light-receiving portions 76a and 76b are compensated in the respective TES light-receiving sections 72a and 72b based on the results of light received by the second light-receiving portions 77a and 77b. In the embodiment, the results S81a and S82a of light received by the respective sub beam-receiving elements 81a and 82a are compensated in the first TES light-receiving section 72a based on the results S123a and S124a of light received by the respective interposed light-receiving elements 123a and 124a. Further, the results S81b and S82b of light received by the respective sub beam-receiving elements 81b and 82a are compensated in the second TES light-receiving section 72b based on the results S123b and S124b of light received by the respective interposed light-receiving elements 123b and 125b. To be specific, the compensations are carried out by calculating the following formula (6) to formula (9).

$$S81aR = S81a - k21 \times S123a \quad (6)$$

$$S82aR = S82b - k22 \times S124a \quad (7)$$

$$S81bR = S81b - k23 \times S123b \quad (8)$$

$$S82bR = S82b - k24 \times S124b \quad (9)$$

In the above formula (6), S81aR represents a result obtained in the first TES light-receiving section 72a by compensating the result S81a of light received by the sub beam-receiving element 81a. In the above formula (7), S82aR represents a result obtained in the first TES light-receiving section 72a by compensating the result S82a of light received by the sub beam-receiving element 82a. Both of k21 and k22 are coefficients which respectively represent amplification degrees of the results S123a and S124a of light respectively received by the interposed light-receiving elements 123a and 124a with respect to the results S81a and S82a of light received by the respective sub beam-receiving elements 81a and 82a. The amplification degrees have been predetermined based on a ratio of the + first-order diffracted light of main beam coming from the non-light-condensing recording layer 41b between a quantity of light entering the respective sub beam-receiving elements 81a and 82a and a quantity of light entering the respective interposed light-receiving elements 123a and 124a.

In the above formula (8), S81bR represents a result obtained in the second TES light-receiving section 72b by compensating the result S81b received by the sub beam-receiving element 81b. In the above formula (9), S82bR represents a result obtained in the second TES light-receiving section 72b by compensating the result S82b of light received by the sub beam-receiving element 82b. Both of k23 and k24 are coefficients which respectively represent amplification degrees of the results S123b and S124b of light respectively received by the interposed light-receiving elements 123b and 124b with respect to the results S81b and S82b of light received by the respective sub beam-receiving elements 81b and 82b. The amplification degrees have been predetermined based on a ratio of the − first-order diffracted light of main beam coming from the non-light-condensing recording layer 41b between a quantity of light entering the respective sub beam-receiving elements 81b and 82b and a quantity of light entering the respective interposed light-receiving elements 123b and 124b.

The tracking error signal TES is obtained by calculating the following formula (10).

$$TES = (S80a - S80b) - k25 \times \{(S81aR - S81bR) + (S82aR - S82bR)\} \quad (10)$$

In the formula (10), (S80a−S80b) represents a push pull signal of main beam; (S81aR−S81bR) and (S82aR−S82bR) represent push pull signals of respective sub beams; and k25 represents a coefficient which is used for compensating the difference in light intensity between the main beam and the respective sub beams.

In the present embodiment as just stated, it is possible to achieve an effect similar to the above effect according to the first embodiment. In the beam splitter 130 according to the present embodiment, of the first boundary line 93, the part 96 located radially outward of the reference optical axis L is out of the first virtual line 86 so that the pair of TES splitting regions 132a and 132b are larger than those which are bounded with use of the part 96 extending along the first virtual line 86. This enables to increase a quantity of light which is reflected by the light-condensing recording layer 41a and reaches the respective TES light-receiving sections 72a and 72b. Accordingly, the S/N ratio can be improved in the tracking error signal.

Figure 10:
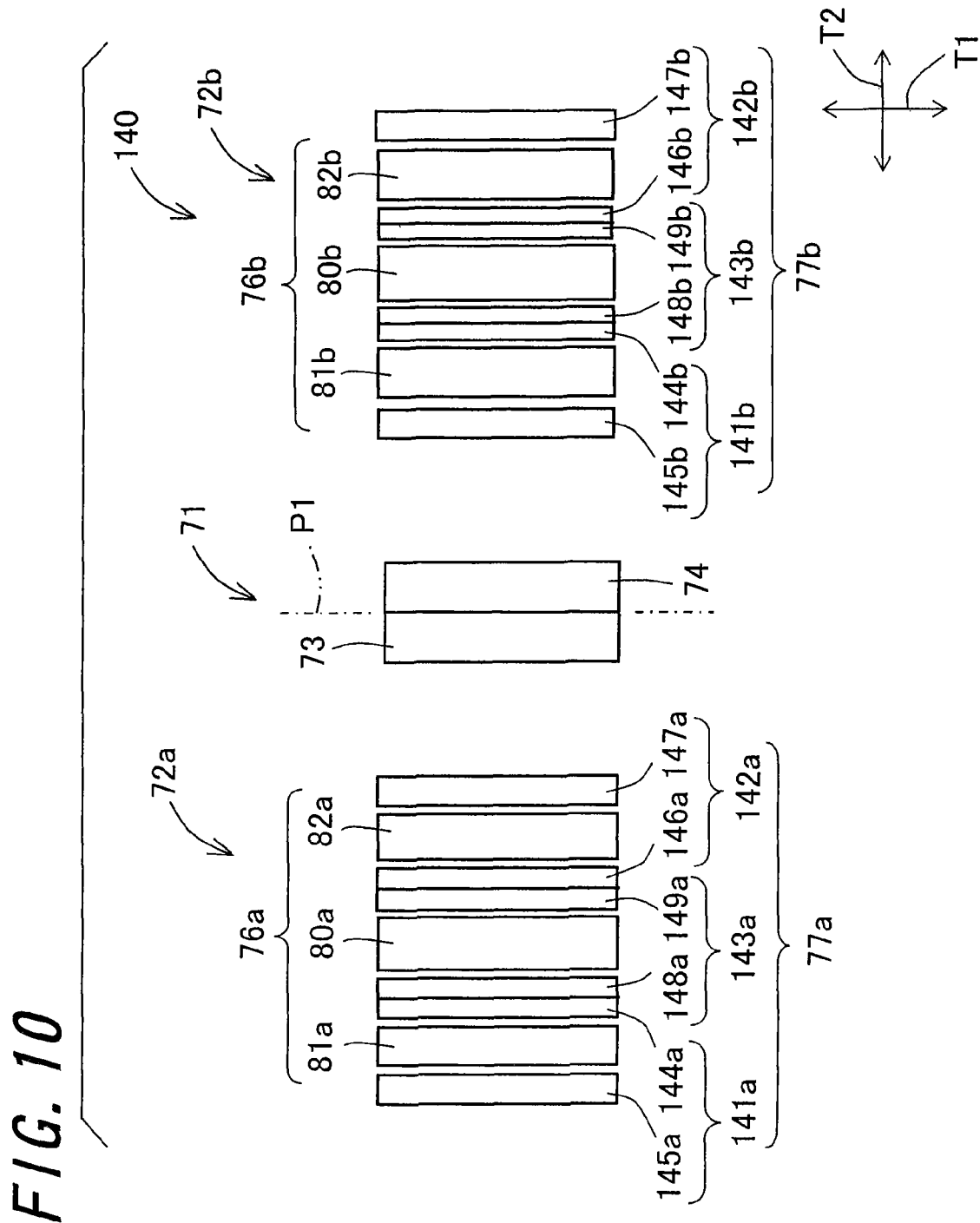
FIG. 10 is a front view showing a configuration of a light-receiving unit disposed in an optical pickup apparatus according to a third embodiment of the invention.

FIG. 10 is a front view showing a configuration of a light-receiving unit 140 disposed in an optical pickup apparatus according to a third embodiment of the invention. The optical pickup apparatus according to the present embodiment is similar to the above optical pickup apparatus according to the second embodiment, and therefore corresponding parts will be denoted by the same reference symbols and descriptions thereof will be omitted while only different points will be described.

The second light-receiving portion 77a in the first TES light-receiving section 72a includes the first light-receiving part 141a for sub beam compensation, a second light-receiving part 142a for sub beam compensation, and a light-receiving part 143a for main beam compensation. The first sub beam-receiving part 141a is used for compensating the result of light reception by the first sub beam-receiving element 81a. The second light-receiving part 142a for sub beam compensation is used for compensating the result of light reception by the second sub beam-receiving element 82a. The light-receiving part 143a for main beam compensation is used for compensating the result of light reception by the main beam-receiving element 80a.

The first light-receiving part 141a for sub beam compensation is disposed way from both of the positions where the main beam reflected by the light-condensing recording layer 41a is condensed and where the respective sub beams reflected by the light-condensing recording layer 41a are condensed so that the first light-receiving part 141a for sub beam compensation is adjacent to the first sub beam-receiving element 81a. The first light-receiving part 141a for sub beam compensation includes an interposed light-receiving element 144a and an opposite-side light-receiving element 145a. The interposed light-receiving element 144a is disposed between the first sub beam-receiving element 81a and the main beam-receiving element 80a. The opposite-side light-receiving element 145a is disposed, relative to the first sub beam-receiving element 81a, on one side opposite to the side on which the interposed light-receiving element 144a is disposed.

The second light-receiving part 142a for sub beam compensation is disposed way from both of the positions where the main beam reflected by the light-condensing recording layer 41a is condensed and where the respective sub beams reflected by the light-condensing recording layer 41a are condensed so that the second light-receiving part 142a for sub beam compensation is adjacent to the second sub beam-receiving element 82a. The second light-receiving part 142a for sub beam compensation includes an interposed light-receiving element 146a and an opposite-side light-receiving element 147a. The interposed light-receiving element 146a is disposed between the second sub beam-receiving element 82a and the main beam-receiving element 80a. The opposite-side light-receiving element 147a is disposed, relative to the second sub beam-receiving element 82a, on one side opposite to the side on which the interposed light-receiving element 146a is disposed.

The light-receiving part 143a for main beam compensation is disposed way from both of the positions where the main beam reflected by the light-condensing recording layer 41a is condensed and where the respective sub beams reflected by the light-condensing recording layer 41a are condensed so that the light-receiving part 143a for main beam compensation is adjacent to the main beam-receiving element 80a. The light-receiving part 143a for main beam compensation includes a one-side light-receiving element 148a and an other-side light-receiving element 149a. The one-side light-receiving element 148a is disposed between the first sub beam-receiving element 81a and the main beam-receiving element 80a. The other-side light-receiving element 149a is disposed between the second sub beam-receiving element 82a and the main beam-receiving element 80a.

The light-receiving elements 144a to 149a of the second light-receiving portion 77a in the first TES light-receiving section 72a respectively have light-receiving surfaces of substantially rectangular shape. The light-receiving surfaces of the light-receiving elements 144a to 149a respectively extend in the tracking direction T1. The light-receiving elements 144a to 149a as above are respectively achieved by photodiodes. The light reflected by the light-condensing recording layer 41a does not reach the respective light-receiving elements 144a to 149a. In detail, the main beam reflected by the light-condensing recording layer 41a and the respective sub beams reflected by the light-condensing recording layer 41a do not reach the respective light-receiving elements 144a to 149a.

The second light-receiving portion 77b in the second TES light-receiving section 72b is so similar to the second light-receiving portion 77a in the first TES light-receiving section 72a that descriptions of the second light-receiving portion 77b will be omitted to avoid overlapping explanations. Corresponding parts will be denoted by the same reference numerals with "b" instead of "a".

Figure 11:
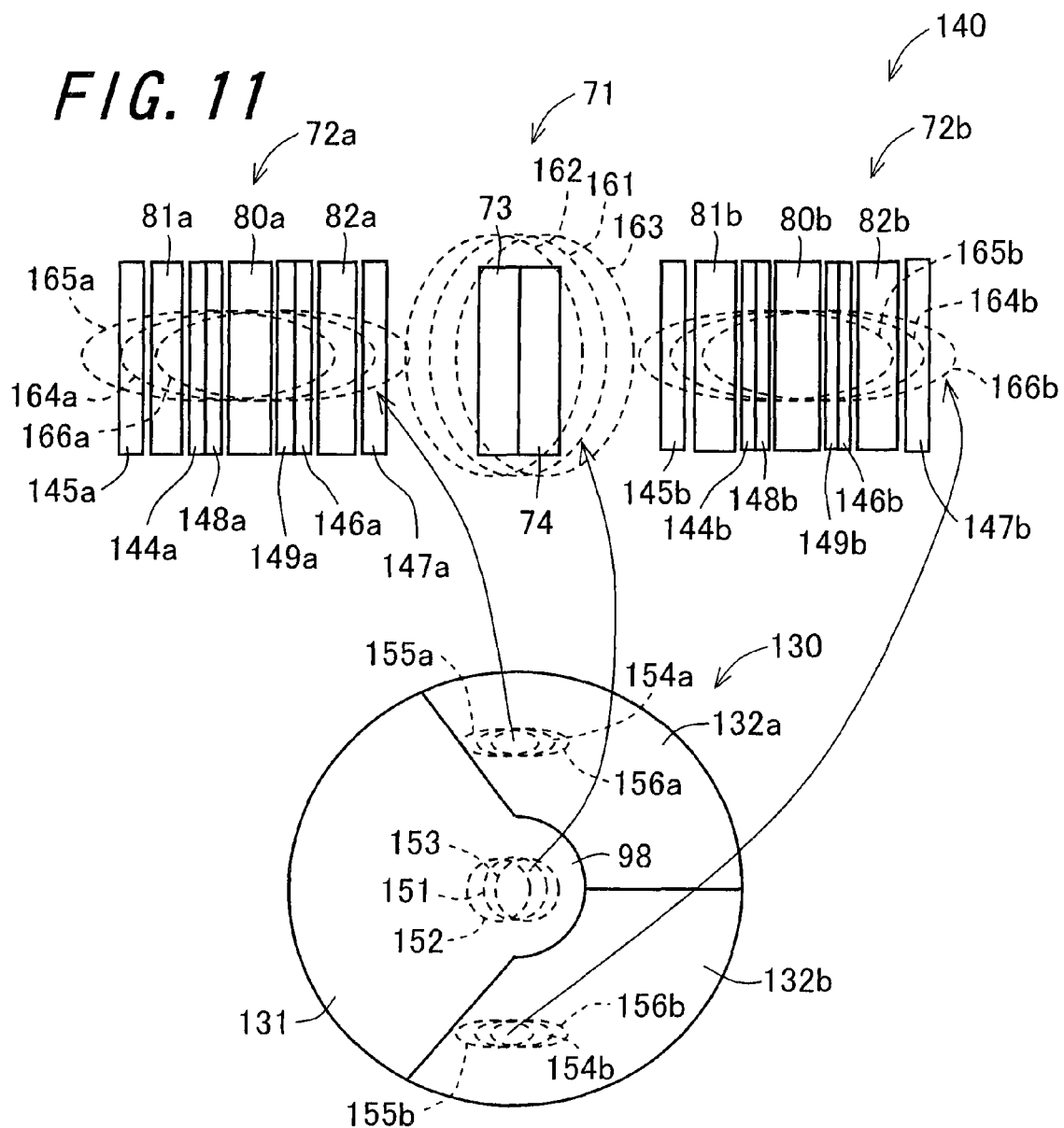
FIG. 11 is a view illustrating how light reflected by a non-light-condensing recording layer is received.

FIG. 11 is a view illustrating how the light reflected by the non-light-condensing recording layer 41b is received. For the sake of facilitating the understanding, the light reflected by the light-condensing recording layer 41a is omitted, and only the light reflected by the non-light-condensing recording layer 41b is shown in FIG. 11. In FIG. 11, it is assumed that the non-light-condensing recording layer 41b is located behind the light-condensing recording layer 41a when the optical disk 42 is viewed from the light source 43. The zero-order diffracted light of respective beams coming from the non-light-condensing recording layer 41b and the ± first-order diffracted light of respective beams coming from the non-light-condensing recording layer 41b enter the beam splitter 130.

The zero-order diffracted light of respective beams coming from the non-light-condensing recording layer 41b forms light spots 151, 152, and 153 on the beam splitter 130 in the vicinity of the standard optic axis L. These light spots 151, 152, and 153 are formed only on the FES splitting region 131 among the respective splitting regions 131, 132a, and 132b of the beam splitter 130. To put it the other way around, shape and size of the beam splitter 130, particularly the protruding part 99 in the FES splitting region 131, are set so that the respective light spots 151 to 153 are formed only in the FES splitting region 131 among the respective splitting regions 131, 132a, and 132b of the beam splitter 130. Even in the case where the respective light spots 151 to 153 become the maximum, the shape and size of the protruding part 99 in the FES splitting region 131 are desirably set so as to include the whole light spots 151 to 153. The respective light spots 151 to 153 become the maximum when a layer-to-layer refractive index is the maximum and a layer-to-layer spacing is the minimum between the light-condensing recording layer 41a and the non-light-condensing recording layer 41b.

The zero-order diffracted light of respective beams coming from the non-light-condensing recording layer 41b is diffracted by the FES splitting region 131 so as to fall on the light-receiving unit. The zero-order diffracted light of respective beams coming from the non-light-condensing recording layer 41b passes through the FES splitting region 131 and falls on the FES light-receiving section 71, thereby forming respective light spots 161, 162, and 163 on the FES light-receiving section 71. Each of the light spots 161, 162, and 163 is spread more than the light spot 101 of the main beam reflected by the light-condensing recording layer 41a. In the embodiment, the respective zero-order diffracted light of main beam coming from the non-light-condensing recording layer 41b passes through the FES splitting region 131, thereafter falling on and being thus received by the respective main beam-receiving elements 73 and 74 in the FES light-receiving section 71.

The + first-order diffracted light of respective beams coming from the non-light-condensing recording layer 41b respectively form light spots 154a, 155a, and 156a on the beam splitter 130 on one side of the reference optical axis L when viewed along the tracking direction T1. The respective light spots 154a, 155a, and 156a are formed only in the first TES splitting region 132a of the beam splitter 130. To put it the other way around, the shape and size of the beam splitter 130, particularly the first TES splitting region 132a, are set so that the respective light spots 154a, 155a, and 156a are formed only in the first TES splitting region 132a among the respective splitting regions 131, 132a, and 132b of the beam splitter 130.

The + first-order diffracted light of respective beams coming from the non-light-condensed layer 41b is diffracted by the first TES splitting region 132a so as to fall on the light-receiving unit. The + first-order diffracted light of respective beams coming from the non-light-condensing recording layer 41b passes through the first TES splitting region 132a and falls on the first TES light-receiving section 72a, thereby forming light spots 164a, 165a, and 166a on the first TES light-receiving section 72a. The respective light spots 164a, 165a, and 166a are spread more than the respective light spots 102, 106, and 107 of beams reflected by the light-condensing recording layer 41a. In the present embodiment, the respective + first-order diffracted light of respective beams coming from the non-light-condensing recording layer 41b passes through the first TES splitting region 132a, thereafter falling on the respective light-receiving elements 80a to 82a and 144a to 149a in the first TES light-receiving section 72a.

The − first-order diffracted light of respective beams coming from the non-light-condensing recording layer 41b respectively form light spots 154b, 155b, and 156b on the beam splitter 130 on the other side of the reference optical axis L when viewed along the tracking direction T1. The respective light spots 154b, 155b, and 156b are formed only in the second TES splitting region 132b of the beam splitter 130. To put it the other way around, the shape and size of the beam splitter 130, particularly the second TES splitting region 132b, are set so that the respective light spots 154b, 155b, and 156b are formed only in the second TES splitting region 132b among the respective splitting regions 131, 132a, and 132b of the beam splitter 130.

The − first-order diffracted light of respective beams coming from the non-light-condensed layer 41b is diffracted by the second TES splitting region 132b so as to fall on the light-receiving unit. The − first-order diffracted light of respective beams coming from the non-light-condensing recording layer 41b passes through the second TES splitting region 72b and falls on the second TES light-receiving section 72b, thereby respectively forming light spots 164b, 165b, and 166b on the second TES light-receiving section 72b. The respective light spots 164b, 165b, and 166b are spread more than the respective light spots 103, 108, and 109 of beams reflected by the light-condensing recording layer 41a. In the present embodiment, the respective − first-order diffracted light of respective beams coming from the non-light-condensing recording layer 41b passes through the second TES splitting region 132b, thereafter falling on the respective light-receiving elements 80b to 82b and 144b to 149b in the second TES light-receiving section 72b.

In producing the tracking error signal, the results of light received by the first light-receiving portions 76a and 76b are compensated in the respective TES light-receiving sections 72a and 72b based on the results of light received by the second light-receiving portions 77a and 77b.

In the first TES light-receiving section 72a, the result S81a of light received by the first sub beam-receiving element 81a is compensated based on the result S144a of light received by the interposed light-receiving element 144a of the first light-receiving part 141a for sub beam compensation has received the light and the result S145a of light received by the opposite-side light-receiving element 145a of the first light-receiving part 141a for sub beam compensation. Further, the result S82a of light received by the second sub beam-receiving element 82a is compensated based on the result S146a of light received by the interposed light-receiving element 146a of the second light-receiving part 142a for sub beam compensation and the result S147a of light received by the opposite-side light-receiving element 146a of the second light-receiving part 142a for sub beam compensation. The result S80a of light received by the main beam light-receiving element 80a is compensated based on the result S148a of light received by the one-side light-receiving element 148a and the result S149a of light received by the other-side light-receiving element S149a. The same goes for the second TES light-receiving section 72b. To be specific, the compensations are carried out by calculating the following formula (11) to formula (16).

$$S81aR = S81a - k31 \times (S144a + S145a) \quad (11)$$

$$S82aR = S82a - k32 \times (S146a + S147a) \quad (12)$$

$$S80aR = S80a - k33 \times (S148a + S149a) \quad (13)$$

$$S81bR = S81b - k34 \times (S144b + S145b) \quad (14)$$

$$S82bR = S82b - k35 \times (S146b + S147b) \quad (15)$$

$$S80bR = S80b - k36 \times (S148b + S149b) \quad (16)$$

In the above formula (11), S81aR represents a result obtained in the first TES light-receiving section 72a by compensating the result S81a of light received by the sub beam-receiving element 81a. In the above formula (12) S82aR represents a result obtained in the first TES light-receiving section 72a by compensating the result S82a of light received by the sub beam-receiving element 82a. In the above formula (13), S80aR represents a result obtained in the first TES light-receiving section 72a by compensating the result S80a of light received by the main beam-receiving element 80a. In the above formula (14), S81bR represents a result obtained in the second TES light-receiving section 72b by compensating the result S81b of light received by the sub beam-receiving element 81b. In the above formula (15), S82bR represents a result obtained in the second TES light-receiving section 72b by compensating the result S82b of light received by the sub beam-receiving element 82b. In the above formula (16) S80bR represents a result obtained in the second TES light-receiving section 72b by compensating the result S80b of light received by the main beam-receiving element 80b. Each of k31 to k36 is a coefficient which represents an amplification degree. The amplification degree is predetermined based on the ratio of quantity of entering light.

The tracking error signal TES is obtained by calculating the following formula (17).

$$TES = (S80aR - S80bR) - k37 \times \{(S81aR - S81bR) + (S82aR - S82bR)\} \quad (17)$$

In the formula (17), (S80a−S80b) represents a push pull signal of main beam; (S81aR−S81bR) and (S82aR−S82bR) represent push pull signals of respective sub beams; and k37 represents a coefficient which is used for compensating the difference in light intensity between the main beam and the respective sub beams.

Also in the present embodiment as just stated, it is possible to achieve an effect similar to the above effect according to the second embodiment. According to the present embodiment, the ± first-order diffracted light of respective beams coming from the non-light-condensing recording layer 41b passes through the respective TES splitting regions 132a and 132b and is undesirably received by the main beam-receiving elements 80a and 80b in the respective TES light-receiving sections 72a and 72b. In view of this point, the compensating section 56 compensates the results of light received by the respective beam-receiving elements 80a and 80b, as described above. Accordingly, it is possible to suppress the adverse effect on the tracking error signal, which effect is caused by the ± first-order diffracted light of main beam coming from the non-light-condensing recording layer 41b.

In compensating the results of light received by the main beam-receiving elements 80a and 80b in the respective TES light-receiving sections 72a and 72b, the respective results are used on how the one-side light-receiving elements 148a and 148b and the other-side light-receiving elements 149a and 149b have received the light. This allows for high-accuracy compensation of the results of light received by the main beam-receiving elements 80a and 80b in the respective light-receiving sections 72a and 72b. Further, in compensating the result of light reception by the first sub beam-receiving element 81a in the first TES light-receiving section 72a, the respective results are used on how the interposed light-receiving element 144a and the opposite-side light-receiving element 145a have received the light. This allows for high-accuracy compensation of the results of light received by the first sub beam-receiving element 81a in the first TES light-receiving section 72a. The same goes for the other sub beam-receiving elements 82a, 81b, and 82b. The adverse effect resulting from the ± first-order diffracted light of respective beams coming from the non-light-condensing recording layer 41b can be therefore suppressed as effectively as possible.

Figure 12:
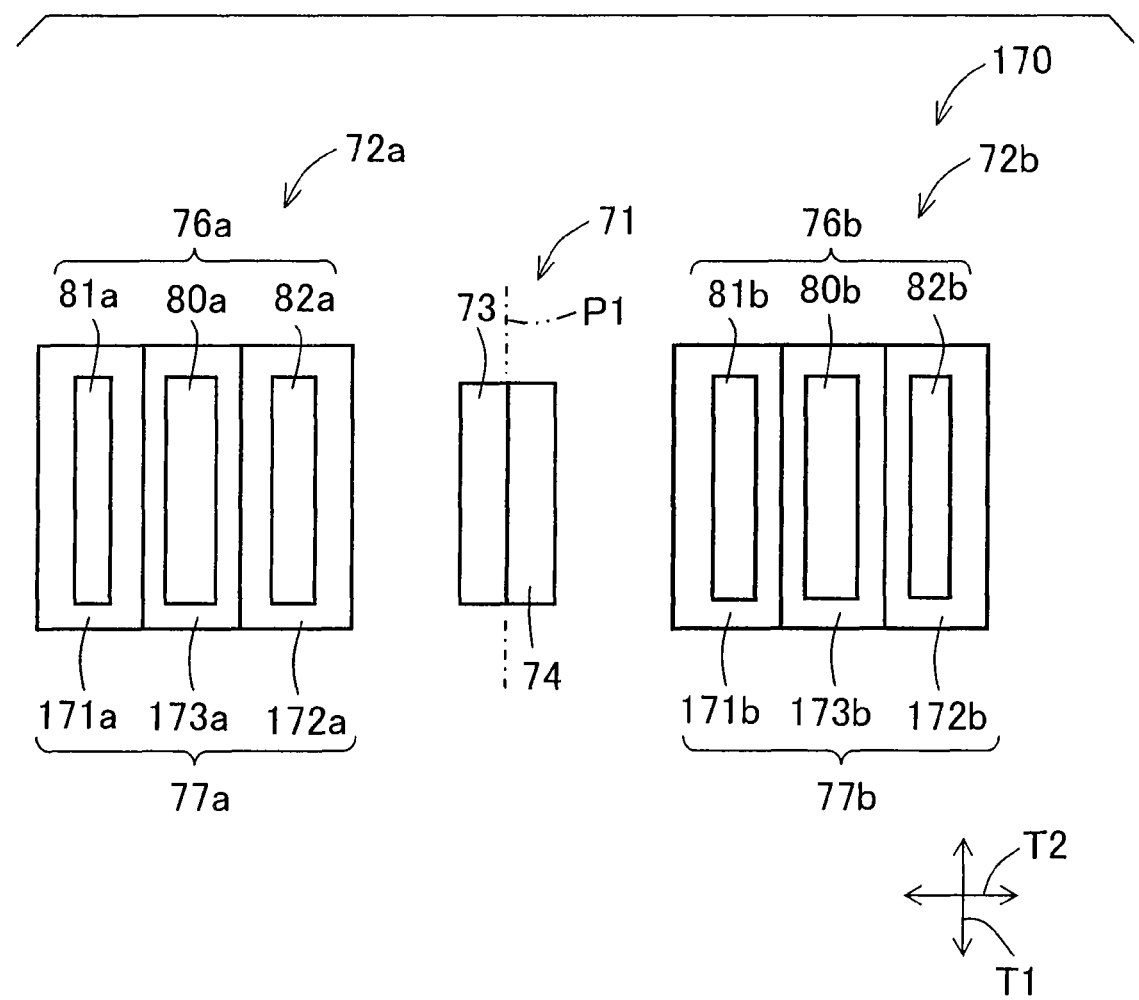
FIG. 12 is a front view showing a configuration of a light-receiving unit disposed in an optical pickup apparatus according to a fourth embodiment of the invention.

FIG. 12 is a front view showing a configuration of a light-receiving unit 170 disposed in an optical pickup apparatus according to a fourth embodiment of the invention. The optical pickup apparatus according to the present embodiment is similar to the above optical pickup apparatus according to the third embodiment, and therefore corresponding parts will be denoted by the same reference symbols and descriptions thereof will be omitted while only different points will be described.

In the second light-receiving portion 77a in the first TES light-receiving section 72a, the first light-receiving part 171a for sub beam compensation has the interposed light-receiving element 144a and the opposite-side light-receiving element 145a which are integrated with each other. In the present embodiment, the first light-receiving part 171a for sub beam compensation is formed so as to enclose the first sub beam-receiving element 81a. A second light-receiving part 172a for sub beam compensation has the interposed light-receiving element 146a and the opposite-side light-receiving element 147a which are integrated with each other. In the present embodiment, the second light-receiving part 172a for sub beam compensation is formed so as to enclose the second sub beam-receiving element 82a. A light-receiving part 173a for main beam compensation has the one-side light-receiving element 148a and the other-side light-receiving element 149a which are integrated with each other. In the present embodiment, the light-receiving part 173a for main beam compensation is formed so as to enclose the main beam-receiving element 80a.

The second light-receiving portion 77b in the second TES light-receiving section 72b is so similar to the second light-receiving portion 77a in the first TES light-receiving section 72a that descriptions of the second light-receiving portion 77b will be omitted to avoid overlapping explanations. Corresponding parts will be denoted by the same reference numerals with "b" instead of "a".

Figure 13:
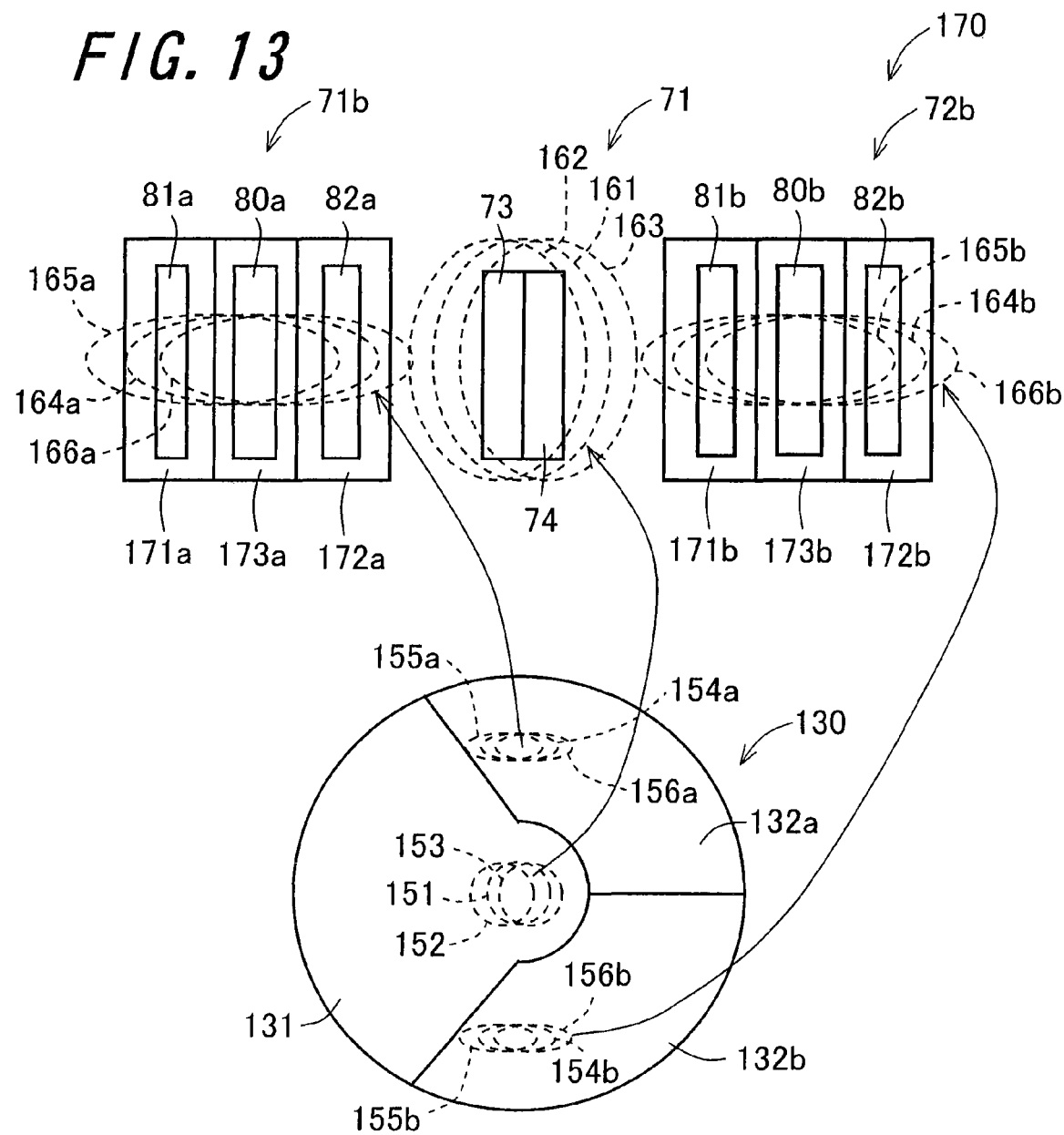
FIG. 13 is a view illustrating how light reflected by a non-light-condensing recording layer is received.
Figure 14:
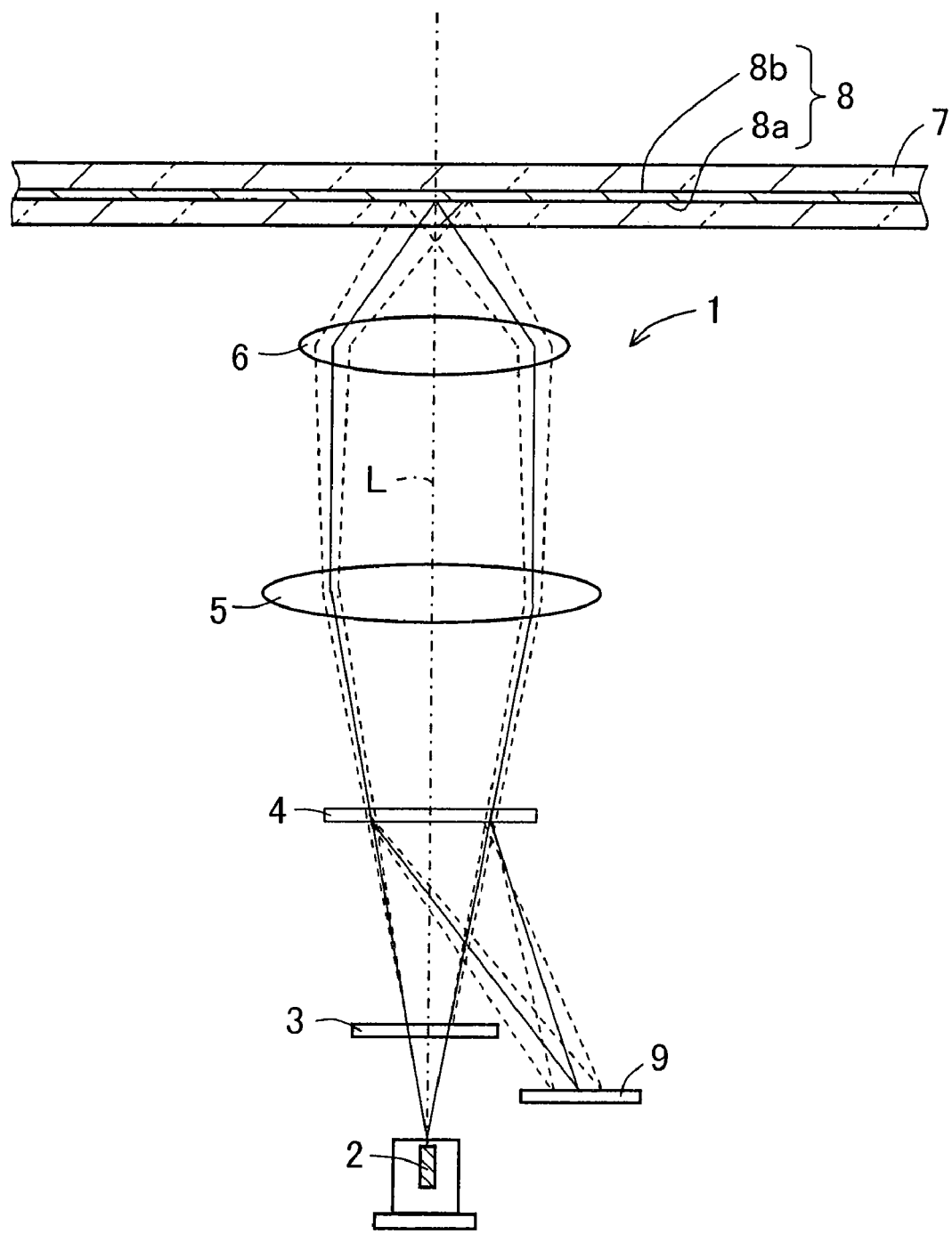
FIG. 14 is a schematic view showing a configuration of an optical pickup apparatus of related art.
Figure 15:
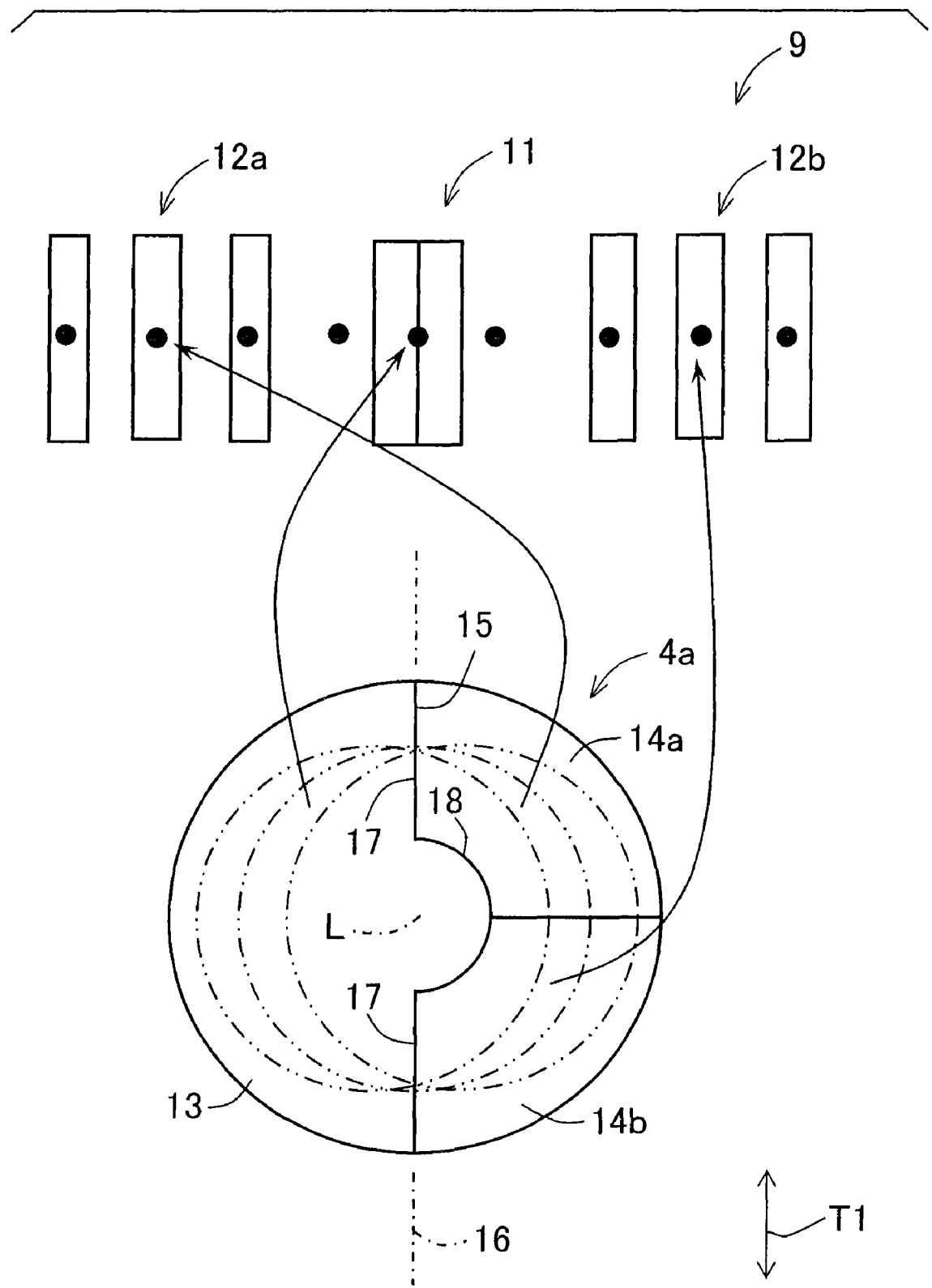
FIG. 15 is a view showing one example of a beam splitter.
Figure 16:
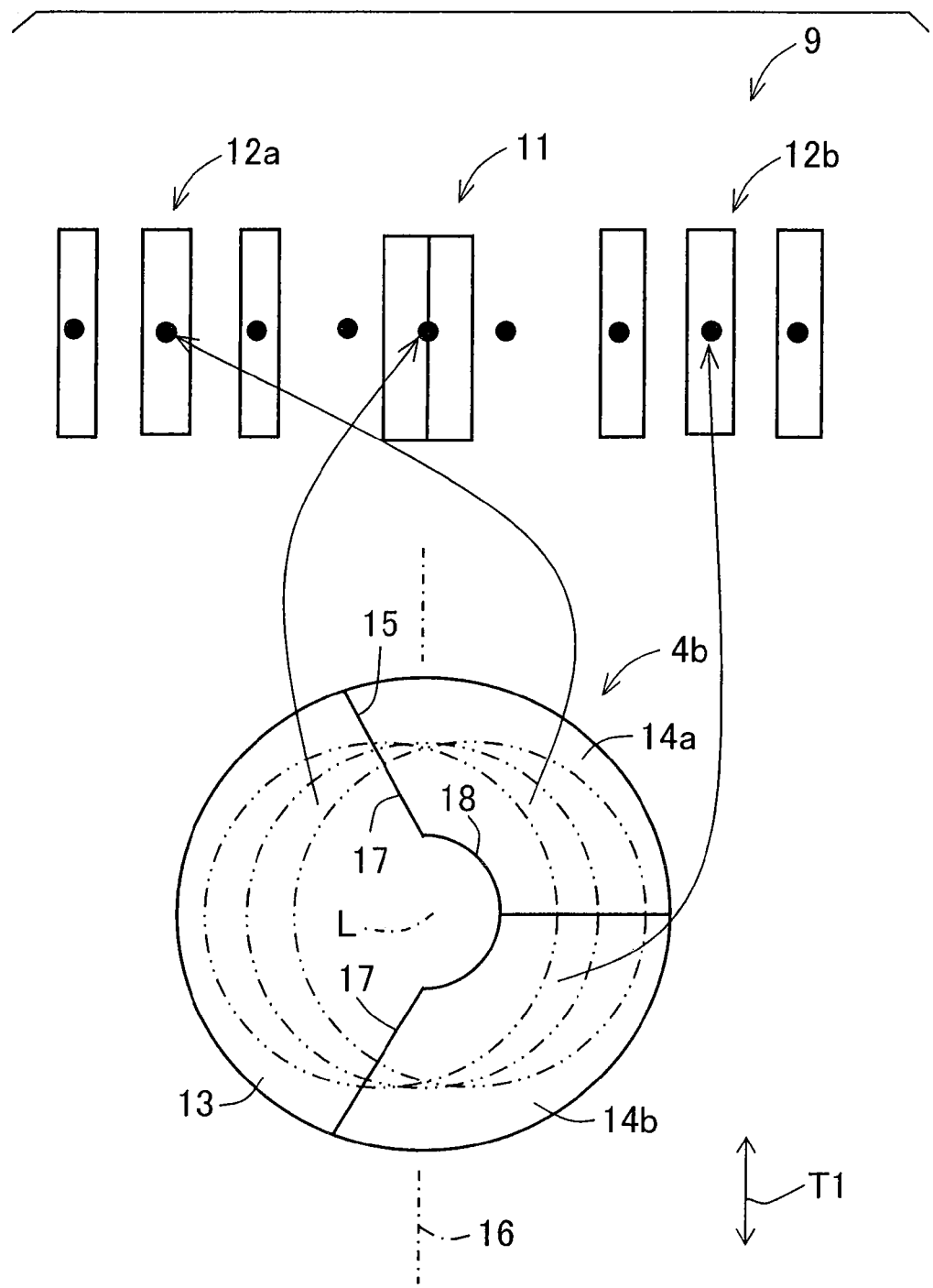
FIG. 16 is a view showing another example of the beam splitter.
Figure 17:
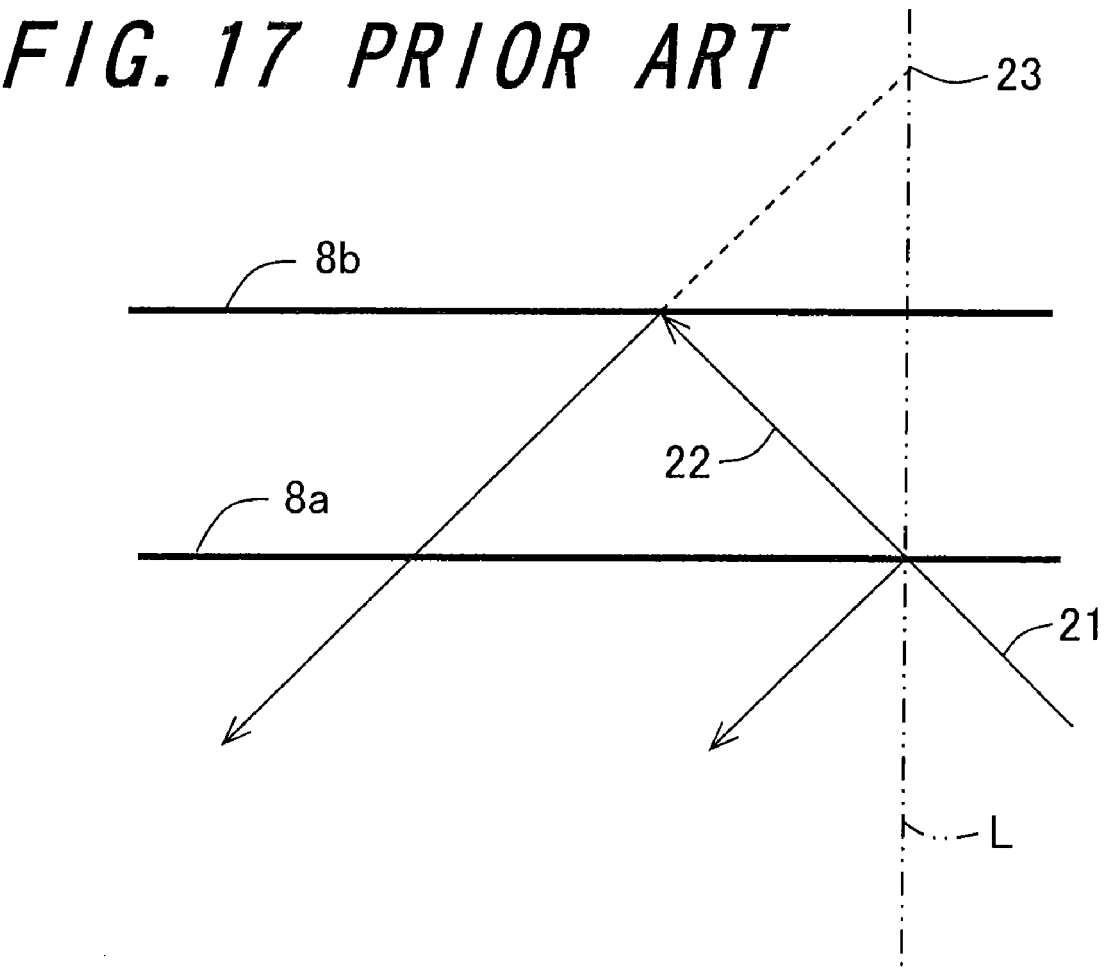
FIG. 17 is a view of assistance in briefly explaining how an optical disk having two recording layers transmits and reflects light.
Figure 18:
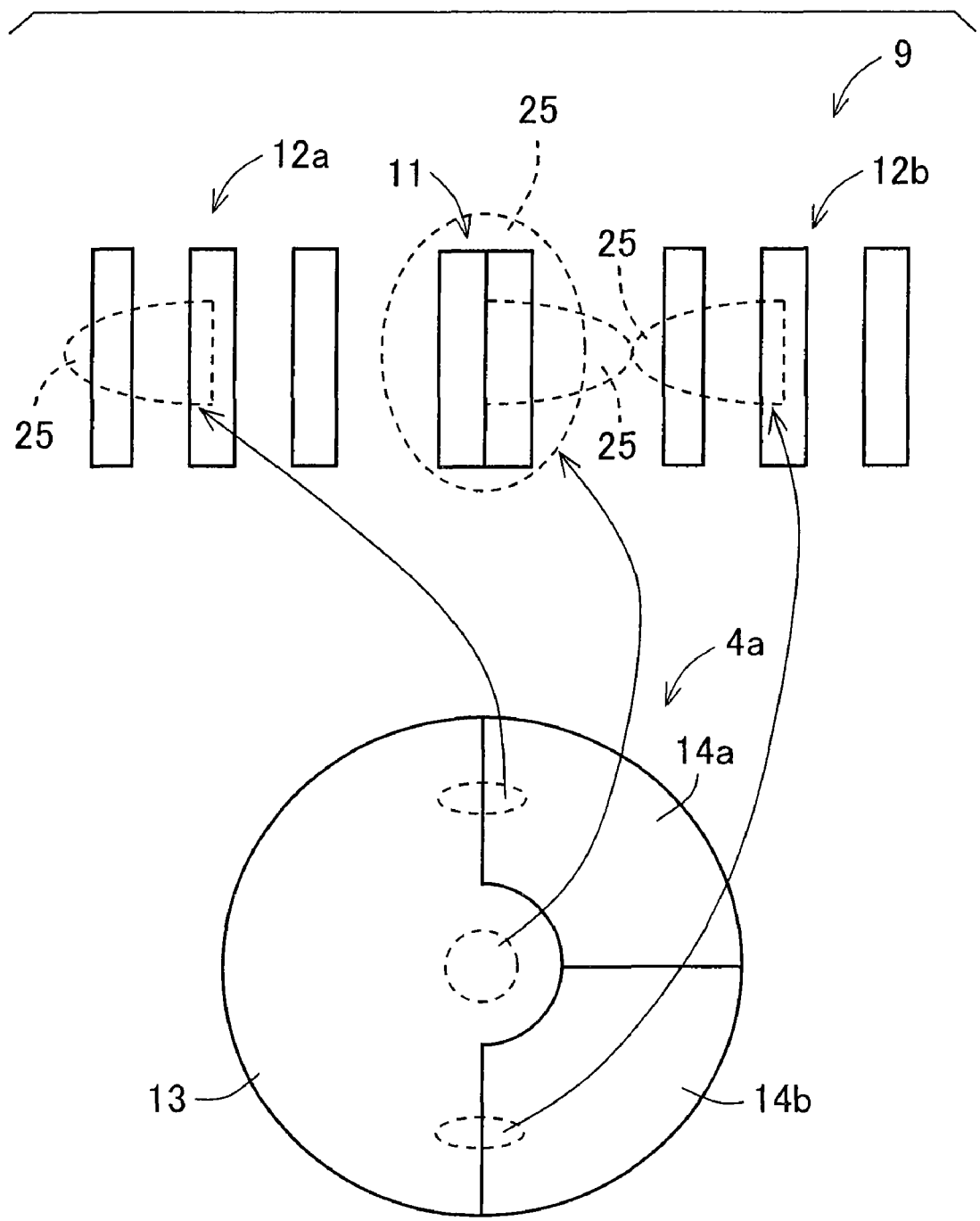
FIG. 18 is a view illustrating how light reflected by a non-light-condensing recording layer is received by a light-receiving unit through the beam splitter shown in FIG. 15.
Figure 19:
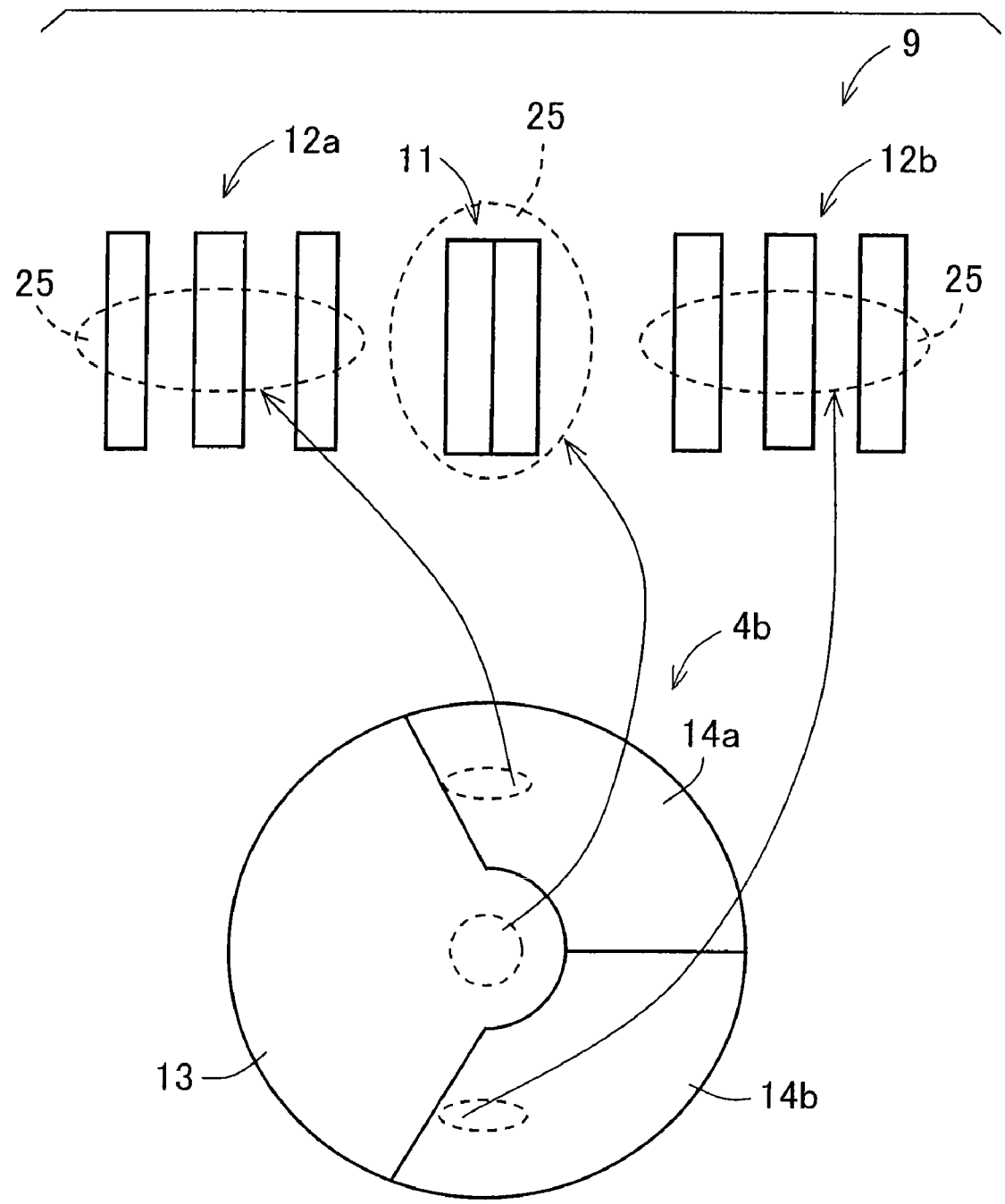
FIG. 19 is a view illustrating how light reflected by a non-light-condensing recording layer is received by a light-receiving unit through the beam splitter shown in FIG. 16.

FIG. 13 is a view illustrating how the light reflected by the non-light-condensing recording layer 41b is received. For the sake of facilitating the understanding, the light reflected by the light-condensing recording layer 41a is omitted, and only the light reflected by the non-light-condensing recording layer 41b is shown in FIG. 13. In FIG. 13, it is assumed that the non-light-condensing recording layer 41b is located behind the light-condensing recording layer 41a when the optical disk 42 is viewed from the light source 43.

The + first-order diffracted light of respective beams coming from the non-light-condensed layer 41b is diffracted by the first TES splitting region 132a so as to fall on the light-receiving unit. The + first-order diffracted light of respective beams coming from the non-light-condensing recording layer 41b passes through the first TES splitting region 132a and falls on the first TES light-receiving section 72a, thereby forming respective light spots 164a, 165a, and 166a on the first TES light-receiving section 72a. The respective light spots 164a, 165a, and 166a are spread more than the respective light spots 102, 106, and 107 of beams reflected by the light-condensing recording layer 41a. In the present embodiment, the respective + first-order diffracted light of respective beams coming from the non-light-condensing recording layer 41b passes through the first TES splitting region 132a, thereafter falling on and being thus received by the respective light-receiving elements 80a to 82a and the respective light-receiving parts 171a to 173a for compensation in the first TES light-receiving section 72a.

The − first-order diffracted light of respective beams coming from the non-light-condensed layer 41b is diffracted by the second TES splitting region 132b so as to fall on the light-receiving unit. The − first-order diffracted light of respective beams coming from the non-light-condensing recording layer 41b passes through the second TES splitting region 132b and falls on the second TES light-receiving section 72b, thereby respectively forming light spots 164b, 165b, and 166b on the second TES light-receiving section 72b. The respective light spots 164b, 165b, and 166b are spread more than the respective light spots 103, 108, and 109 of beams reflected by the light-condensing recording layer 41a. In the present embodiment, the respective − first-order diffracted light of respective beams coming from the non-light-condensing recording layer 41b passes through the second TES splitting region 132b, thereafter falling on and being thus received by the respective light-receiving elements 80b to 82b and respective light-receiving parts 171b to 173b for compensation in the second TES light-receiving section 72b.

In producing the tracking error signal, the results of light received by the first light-receiving portions 76a and 76b are compensated in the respective TES light-receiving sections 72a and 72b based on the results of light received by the second light-receiving portions 77a and 77b.

In the first TES light-receiving section 72a, the result S81a of light received by the first sub beam-receiving element 81a is compensated based on the result S171a of light received by the first light-receiving part 171a for sub beam compensation. Further, the result S82a of light received by the second sub beam-receiving element 82a is compensated based on the result S172a of light received by the second light-receiving part 172a for sub beam compensation. The result S80a of light received by the main beam light-receiving element 80a is compensated based on the result S173a of light received by the light-receiving part 173a for main beam compensation. The same goes for the second TES light-receiving section 72b. To be specific, the compensations are carried out by calculating the following formula (18) to formula (23).

$$S81aR = S81a - k41 \times (S171a) \tag{18}$$

$$S82aR = S82a - k42 \times (S172a) \tag{19}$$

$$S80aR = S80a - k43 \times (S173a) \tag{20}$$

$$S81bR = S81b - k44 \times (S171b) \tag{21}$$

$$S82bR = S82b - k45 \times (S172b) \tag{22}$$

$$S80bR = S80b - k46 \times (S173b) \tag{23}$$

In the above formula (18), S81aR represents a result obtained in the first TES light-receiving section 72a by compensating the result S81a of light received by the sub beam-receiving element 81a. In the above formula (19), S82aR represents a result obtained in the first TES light-receiving section 72a by compensating the result S82a of light received by the sub beam-receiving element 82a. In the above formula (20), S80aR represents a result obtained in the first TES light-receiving section 72a by compensating the result S80a of light received by the main beam-receiving element 80a. In the above formula (21), S81bR represents a result obtained in the second TES light-receiving section 72b by compensating the result S81b of light received by the sub beam-receiving element 81b. In the above formula (22), S82bR represents a result obtained in the second TES light-receiving section 72b by compensating the result S82b of light received by the sub beam-receiving element 82b. In the above formula (23), S80bR represents a result obtained in the second TES light-receiving section 72b by compensating the result S80b of light received by the main beam-receiving element 80b. Each of k41 to k46 is a coefficient which represents an amplification degree. The amplification degree is predetermined based on the ratio of quantity of entering light.

The tracking error signal TES is obtained by calculating the following formula (24).

$$TES = (S80aR - S80bR) - k47 \times \{(S81aR - S81bR) + (S82aR - S82bR)\} \tag{24}$$

In the formula (24), (S80a−S80b) represents a push pull signal of main beam; (S81aR−S81bR) and (S82aR−S82bR) represent push pull signals of respective sub beams; and k47 represents a coefficient which is used for compensating the difference in light intensity between the main beam and the respective sub beams.

According to the present embodiment as just stated, it is possible to achieve an effect similar to the above effect according to the third embodiment. Further, according to the present embodiment, the first light-receiving part 171a for sub beam compensation in the first TES light receiving section 72a has the interposed light-receiving element 144a and the opposite-side light-receiving element 145a which are integrated with each other, thus eliminating the need of providing an adder circuit for adding the result of light reception by the interposed light-receiving element 144a, to the result of light reception by the opposite-side light-emitting element 145a. This allows for a simplified circuit structure of the compensating section 56. The same goes for the other light-receiving parts 172a, 171b, and 172b for sub beam compensation. Further, the light-receiving part 173a for main beam compensation in the first TES light receiving section 72a has the one-side light-receiving element 148a and the other-side light-receiving element 149a which are integrated with each other, thus eliminating the need of providing an adder circuit for adding the result of light reception by the one-side light-receiving element 148a, to the result of light reception by the other-side light-emitting element 149a. This allows for a simplified circuit structure of the compensating section 56. The same goes for the other light-receiving part 173b for main beam compensation.

All of the above embodiments are merely illustrative, and structures therein are changeable within the scope of the invention. Although the structure for producing the focusing error signal and the structure for producing the tracking error signal are integrated with each other in the above embodiments, the configuration of the invention is not limited to the configurations described herein. For example, the beam splitter and light-receiving section for producing the focusing error signal may be separated from the beam splitter and light-receiving section for producing the tracking error signal. Even in this case, it is possible to achieve an effect similar to the effects according to the above embodiments.

In addition, although the descriptions have been made on the assumption that the optical disk is a single sided dual-layer disk, the optical disk is not limited to the single sided dual-layer disk. The optical disk may have three or more layers, for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup apparatus which is used for recording information on or reproducing information from an optical disk having a plurality of recoding layers by irradiating the optical disk with light, the optical pickup apparatus comprising:
   a light source for emitting light;
   an optical system for condensing the light emitted from the light source onto a recording layer of the optical disk and condensing light reflected by the recording layer of the optical disk;
   a light-receiving unit for receiving light reflected by the recording layers of the optical disk through the optical system, the light-receiving unit having a first light-receiving portion for receiving light reflected by a light-condensing recording layer which is a recording layer of the optical disk and is currently involved in condensing the light emitted from the light source, the first light-receiving portion being disposed at a condensing position of the light reflected by the light-condensing recording layer, and a second light-receiving portion for receiving light reflected by a non-light-condensing recording layer which is another recoding layer of the optical disk and is currently not involved in condensing the light emitted from the light source, the second light-receiving portion being disposed adjacent to the first light-receiving portion and away from the condensing position of the light reflected by the light-condensing recording layer; and
   a compensating section for compensating a result of light reception by the first light-receiving portion based on a result of light reception by the second light-receiving portion,
   wherein the optical system splits the light emitted from the light source, into a main beam and a pair of sub beams, and condenses the main beam and sub beams on the recording layer of the optical disk,
   the first light-receiving portion has a main beam-receiving element, disposed at a condensing position of main beam reflected by the light-condensing recording layer, for receiving the main beam reflected by the light-condensing recording layer, and a pair of sub beam-receiving elements, disposed at condensing positions of sub beams reflected by the light-condensing recording layer, for respectively receiving the sub beams reflected by the light-condensing recording layer,
   the second light-receiving portion has a light-receiving part for main beam compensation, disposed away from a condensing position of a main beam reflected by the light-condensing recording layer, and condensing positions of sub beams reflected by the light-condensing recording layer, and adjacent to the main beam-receiving element, for receiving the main beam reflected by the non-light condensing layer, which is used for compensating a result of light reception by the main beam-receiving element, and
   the compensating section compensates a result of light reception by the main beam-receiving element based on a result of light reception by the light-receiving part for main beam compensation.

2. The optical pickup apparatus of claim 1, wherein the optical system splits the light emitted from the light source, into a main beam and a pair of sub beams, and condenses the main beam and sub beams on the recording layer of the optical disk,
   the first light-receiving portion has a main beam-receiving element, disposed at a condensing position of a main beam reflected by the light-condensing recording layer, for receiving the main beam reflected by the light-condensing recording layer, and a pair of sub beam-receiving elements, disposed at condensing positions of sub beams reflected by the light-condensing recording layer, for respectively receiving the sub beams reflected by the light-condensing recording layer,
   the second light-receiving portion has a light-receiving part for sub beam compensation which receives the main beam reflected by the non-light-condensing recording layer and is used for compensating a result of light reception by one of the sub beam-receiving elements that the main beam reflected by the non-light-condensing recording layer enters, the light-receiving part for sub beam compensation being disposed adjacent to the sub beam-receiving elements and away from the condensing position of the main beam reflected by the light-condensing recording layer and condensing positions of sub beams reflected by the light-condensing recording layer, and the compensating section compensates a result of light reception by the sub beam-receiving element based on a result of light reception by the light-receiving part for sub beam compensation.

3. The optical pickup apparatus of claim 2, wherein the light-receiving part for sub beam compensation has an interposed light-receiving element which is interposed between the one of the sub beam-receiving elements that the main beam reflected by the non-light-condensing recording layer enters and the main beam-receiving element, and an opposite-side light-receiving element which is disposed opposite to the interposed light-receiving element relative to the sub beam-receiving element.

4. The optical pickup apparatus of claim 3, wherein the interposed light-receiving element and the opposite-side light-receiving element are integrally formed.

5. The optical pickup apparatus of claim 1, wherein the light-receiving part for main beam compensation has a one-side light-receiving element which is interposed between one of the pair of the sub beam-receiving elements and the main beam-receiving element, and an other-side light-receiving element which is disposed between another of the pair of the sub beam-receiving elements and the main beam-receiving element.

6. The optical pickup apparatus of claim 5, wherein the one-side light-receiving element and the other-side light-receiving element are integrally formed.

7. The optical pickup apparatus of claim 1, wherein in the compensating section, an amplification degree of the result of light reception by the second light-receiving portion relative to the result of light reception by the first light-receiving portion is predetermined based on a ratio of the light reflected by the non-light-condensing recording layer between a quantity of light entering the first light-receiving portion and a quantity of light entering the second light-receiving portion, and in compensating the result of light reception by the first light-receiving portion, the result of light reception by the second light-receiving portion is amplified at the amplification degree, and a result thus obtained is subtracted from the result of light reception by the first light-receiving portion.

8. The optical pickup apparatus of claim 1, wherein the light-receiving unit has a pair of light-receiving sections for tracking which are used for producing a tracking error signal and each of which includes the first light-receiving portion and the second light-receiving portion, and to produce the tracking error signal, the optical system splits the light reflected by the light-condensing recording layer and diffracts the split lights so as to fall on light-receiving sections for tracking, respectively.

9. A beam splitter for splitting light reflected by a recording layer of an optical disk, the beam splitter being included in the optical system in the optical pickup apparatus of claim 1 wherein the light-receiving unit has a light-receiving section for focusing that is used for producing a focusing error signal and a pair of light-receiving sections for tracking that are used for producing a tracking error signal and have the first light-receiving portion and the second light-receiving portion, the beam splitter comprising:

a splitting region for focusing by which light reflected by a light-condensing recording layer is diffracted to fall on the light-receiving section for focusing; and a pair of splitting regions for tracking in each of which light reflected by a light-condensing recording layer is diffracted to fall on each of the light-receiving sections for tracking.

10. The beam splitter of claim 9, wherein, of a boundary line between the splitting region for focusing and the pair of the splitting regions for tracking, a part located radially outward of a reference optical axis of the optical system is formed along a virtual line which is orthogonal to the reference optical axis and extends in a tracking direction.

11. The beam splitter of claim 9, wherein, of a boundary line between the splitting region for focusing and the pair of the splitting regions for tracking, a part located radially outward of the reference optical axis of the optical system is out of a virtual line which is orthogonal to the reference optical axis and extends in a tracking direction, so that the pair of the splitting regions for tracking are larger than a pair of the splitting regions for tracking which are bounded with use of the part extending along the virtual line.

12. The beam splitter of claim 10, wherein, of the boundary line between the splitting region for focusing and the pair of the splitting regions for tracking, a part located radially inward of the reference optical axis of the optical system is out of the virtual line so that, of light reflected by a non-light-condensing recording layer, zero-order diffracted light enters the splitting region for focusing.

13. The beam splitter of claim 11, wherein, of the boundary line between the splitting region for focusing and the pair of the splitting regions for tracking, a part located radially inward of the reference optical axis of the optical system is out of the virtual line so that, of light reflected by a non-light-condensing recording layer, zero-order diffracted light enters the splitting region for focusing.

* * * * *